United States Patent
Croxford et al.

(10) Patent No.: US 12,554,492 B2
(45) Date of Patent: Feb. 17, 2026

(54) DATA PROCESSING SYSTEMS AND METHODS FOR CONTROLLING STORAGE OF INPUT DATA VALUES FOR USE BY AN EXECUTING UNIT

(71) Applicant: Arm Limited, Cambridge (GB)

(72) Inventors: Daren Croxford, Swaffham Prior (GB); Sharjeel Saeed, Cambridge (GB); Isidoros Sideris, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 18/734,396

(22) Filed: Jun. 5, 2024

(65) Prior Publication Data

US 2025/0068420 A1  Feb. 27, 2025

(30) Foreign Application Priority Data

Aug. 22, 2023  (EP) .................................... 23386078

(51) Int. Cl.
 *G06F 9/30* (2018.01)
 *G06F 9/38* (2018.01)

(52) U.S. Cl.
 CPC ...... *G06F 9/30043* (2013.01); *G06F 9/38585* (2023.08)

(58) Field of Classification Search
 CPC ............ G06F 9/30047; G06F 9/30043; G06F 9/3016; G06F 9/3824; G06F 9/3851; G06F 9/3858; G06F 9/38585
 See application file for complete search history.

(56) References Cited

U.S. PATENT DOCUMENTS

| | | | | |
|---|---|---|---|---|
| 5,845,103 A * | 12/1998 | Sodani | ................. | G06F 9/3858 712/216 |
| 6,862,677 B1 * | 3/2005 | Stravers | ............... | G06F 9/30185 712/228 |
| 11,620,132 B2 * | 4/2023 | Fleischer | ............ | G06F 9/30185 712/208 |
| 2015/0154106 A1 * | 6/2015 | Pusdesris | ................ | G06F 9/384 711/154 |
| 2017/0286114 A1 * | 10/2017 | Herdrich | ............... | G06F 9/3836 |
| 2022/0100513 A1 * | 3/2022 | Hughes | ............... | G06F 9/30036 |

* cited by examiner

*Primary Examiner* — Jacob Petranek
(74) *Attorney, Agent, or Firm* — Pearl Cohen Zedek Latzer Baratz LLP

(57) ABSTRACT

Data processing systems comprising a data processor, the data processor comprising an execution unit and storage for storing input data values for use by and/or output data values generated by the execution unit when executing instructions to perform data processing operations, and methods of control thereof, in which control of storage of data values for data source(s) of the storage is based on indication(s), in instruction(s) requiring use of data source(s) for a data processing operation, that one or more data values in the data source(s) are no longer required to be retained.

20 Claims, 11 Drawing Sheets

DATA PROCESSING SYSTEMS AND METHODS FOR CONTROLLING STORAGE OF INPUT DATA VALUES FOR USE BY AN EXECUTING UNIT

BACKGROUND

The technology described herein relates to generally to the operation of data processors that execute program instructions to perform processing operations.

A data processor (e.g. such as a graphics processor, CPU, neural network processor or other processor in a data processing system), in order to execute a program (e.g. a shader program, neural network processing program or other program) typically contains an execution unit or units (circuit or circuits) operable to execute instructions in the program, for example as one or more execution threads.

The data processing operations that are performed by the execution unit (circuit) when executing that program are typically performed by respective functional units (circuits), such as arithmetic units (circuits), of the execution unit, in response to, and under the control of, the instructions in the program being executed. Thus, for example, appropriate functional units, such as arithmetic units, will perform data processing operations in response to and as required by instructions in a program being executed.

An example data processing operation performed by an execution unit (e.g. performed by a functional unit, such as an arithmetic unit) may comprise reading one or more input data values (operands), and processing (e.g. adding, subtracting, dividing, multiplying or otherwise processing) those input data values to generate one or more output data values, and then returning the output data values, e.g. for further processing by subsequent instructions in the program being executed and/or for output (for use otherwise than during execution of the program being executed).

The input data values to be used when executing the instruction will typically be stored in appropriate storage accessible to the execution (functional) unit, such as a register file (register storage, comprising a set of registers) of and/or accessible to the execution unit, and the output data value(s) generated by the execution (functional) unit when executing the instruction will correspondingly be written back to that storage, e.g. register file, for future use. Thus when executing an instruction, an execution unit will read input data values (operands) from appropriate storage, such as a register file, and write its output value(s) back to that storage (e.g. register file).

In order to facilitate this operation, the instructions to be executed will typically indicate the location of the input data value(s) (operand(s)) for the instruction, e.g. in terms of the registers where those value(s) are stored, and, correspondingly, the location where the output data value(s) is to be written to, again, e.g., and typically, in terms of the identity of the register where the output data value(s) is to be written. The execution unit will then, when executing the instruction, read the input value(s) from the indicated source location(s) (e.g. register(s)), and write its output value(s) back to the indicated destination location(s) (e.g. register(s)).

The Applicant believes that there remains scope for improvements to such operation in data processors.

BRIEF DESCRIPTION OF THE DRAWINGS

Embodiments of the technology described herein will now be described by way of example only and with reference to the accompanying drawings, in which.

Like reference numerals are used for like features in the Figures, where appropriate

DETAILED DESCRIPTION

Figure 1:
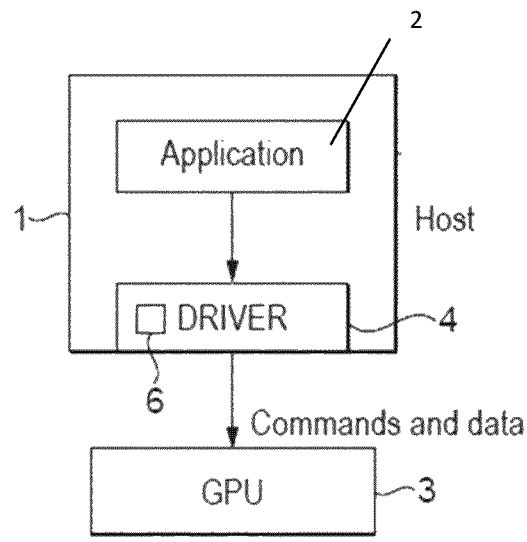
FIG. 1 is a schematic diagram illustrating an exemplary computer graphics processing system.

In an embodiment, the technology described comprises a method of operating a data processing system, the data processing system comprising:

a data processor, the data processor comprising:

an execution unit operable to execute instructions in a program to be executed to perform data processing operations for execution threads executing the program; and storage operable to store input data values for use by the execution unit when executing an instruction to perform a data processing operation for an execution thread and to store output data values generated by the execution unit when performing a data processing operation for an instruction being executed by an execution thread;

the method comprising:

the data processing system, in response to the execution unit of the data processor executing an instruction indicating one or more data sources of the storage for use when performing a data processing operation, and the instruction furthermore including an indication that one or more data values in a data source of the one or more indicated data sources are no longer required to be retained in said data source:

controlling storage of data values in the storage based on the indication in the instruction that one or more data values in a data source of the one or more indicated data sources are no longer required to be retained in said data source.

In an embodiment, the technology described herein comprises a data processing system, the data processing system comprising:

a data processor, the data processor comprising:

an execution unit operable to execute instructions in a program to be executed to perform data processing operations for execution threads executing the program; and storage operable to store data values for use by the execution unit when executing an instruction to perform a data processing operation for an execution thread and to store output data values generated by the execution unit when performing a data processing operation for an instruction being executed by an execution thread;

the data processing system further comprising a processing circuit configured to:

in response to the execution unit of the data processor executing an instruction indicating one or more data sources of the storage for use when performing a data processing operation, and the instruction furthermore including an indication that one or more data values in a data source of the one or more indicated data sources are no longer required to be retained in said data source:

control storage of data values in the storage based on the indication in the instruction that one or more data values in a data source of the one or more indicated data sources are no longer required to be retained in said data source.

The technology described herein relates to execution of programs using data from data source(s) (e.g. such as register storage (a register file)) accessible to the execution unit which is executing instructions for the programs.

In the technology described herein, in addition to indicating in an instruction the data source(s) to be used when performing a data processing operation (for example indicating one or more data sources from which the execution unit of the data processor is to read one or more input data values for use when performing data processing operation(s), and/or indicating one or more data sources to which the execution unit of the data processor is to write one or more output data values generated when performing data processing operation(s)), a further indication can be included in the instruction which indicates whether one or more data value(s) in one or more of those data source(s) are no longer required to be retained (and, on the basis of that indication, storage of data values in those data source(s) is controlled). This further indication may be referred to herein as a 'no longer required to be retained' indication.

In this way, control of storage of data values (e.g. removing/retiring data values from, and loading data values into data sources) is performed responsive to indication(s) within instruction(s) which use that storage.

The Applicant has recognised that such arrangements may improve the efficiency with which program execution proceeds, as it can reduce the need for additional, separate, 'load' instructions for populating the storage with data values (from memory, e.g. main memory) and/or for separate 'store' instructions for writing out data from the storage (to memory, e.g. main memory) (which may otherwise consume a significant amount of execution time, introduce undesirable timing constraints for program execution, and can undesirably cause programs to be stalled whilst waiting for 'load' or 'store' instructions to be executed).

Furthermore, providing 'no longer required to be retained' indications in instructions, can allow input data value(s) to be retained in storage, and be re-used (e.g. read when executing plural different instructions in the sequence of instructions for a program), until a 'no longer required to be retained' indication is encountered in respect of those input data value(s). This can provide energy savings compared to, for example, having to fetch input data values from main memory every time they are needed for executing an instruction.

This may be particularly useful when performing processing for programs in which the order of use of input data values by the execution unit when executing instructions is predictable (e.g. predetermined), such as programs for performing machine learning (e.g. neural network processing). In this case it may be known, for example, that a particular input data value (e.g. input feature map data value, or weight data value) will be re-used a predetermined number of times within a sequence of instructions (e.g. for a set of instructions appearing in close succession), so that a 'no longer required to be retained' instruction can be inserted into an instruction which is the last instruction re-using that data value (or a subsequent instruction) (the indication provided in the instruction in advance of executing the program, e.g. by a compiling process).

Alternatively, or additionally, providing 'no longer required to be retained' indications in instructions, can allow output data values (generated by an execution unit when performing data processing operations for instructions) to be retained in storage until they are no longer required to be retained (e.g. until they are ready to be output, e.g. written out to memory). In this case, a 'no longer required to be retained' indication in an appropriate instruction can be used to cause writing out of one or more output data values to memory (so that no separate 'store' instruction is needed). This can provide energy savings compared to, for example, writing out individual data values to main memory as they are generated.

This may be particularly useful when performing processing for programs in which the order of generation of output input data values is predictable (e.g. predetermined), such as for programs for performing machine learning (e.g. neural network processing). In this case it may be known by which instruction(s) in a sequence of instructions one or more output data values will be generated which are ready to be output (e.g. written out to main memory), so that a 'no longer required to be retained' instruction can be inserted into that instruction (or a subsequent instruction) (the indication being provided in advance of performing processing, e.g. as part of a compiling process).

The technology described herein may be particularly useful for programs performing machine learning (e.g. neural network processing), which may require a large amount of data to be fetched and/or stored throughout execution (e.g. corresponding to weight data arrays and/or input feature maps which may be stored in main memory and which may need to be fetched into storage accessible to the execution unit for execution, and output feature maps generated by the execution unit which may need to be stored to main memory). The Applicant has recognised that efficiency of data storage and access may have a significant impact on program efficiency and throughput (potentially much more so than the efficiency of performing calculations when executing the program).

As noted above, the arrangements of the technology described herein may be particularly appropriate when executing programs in which the order of use of input data values and/or the order of generation of output data values is predictable (deterministic) (in an embodiment predetermined), and the order with which data values fall out of use (or are otherwise no longer required to be retained) is likewise predictable (e.g. predetermined). For such programs it can, for example, be predictable (and in embodiments it is determined) when an instruction in the sequence of instructions for the program is the last instruction using particular input data value(s) from a data source or when an instruction in the sequence of instructions writes particular output data value(s) to a data source, with that instruction (or a subsequent instruction) being provided with an indication that those data values(s) are no longer required to be retained.

Programs for machine learning (e.g. neural network processing) are one example of programs in which the order of use of input data values and order of generation of output data values is predictable (for example, with a kernel of a weight map being applied to input data values of an input feature map to generate output data values in a predictable order), and for which the technology described herein can be particularly useful.

Controlling storage of data values in accordance with the technology described herein, based on an (additional) indication provided in an instruction which indicates that one or more data values are no longer required to be retained in the data source(s) utilised by that instruction, can allow existing data to be removed from data source(s) responsive to existing data falling out of use (or otherwise no longer being required to be retained in that storage). This may have the effect of 'freeing up' space ('freeing up' storage locations) in the storage.

For a data source from which the execution unit is to read input data values when executing instructions, as will be explained in more detail below, the space which is 'freed up' by controlling the storage in the manner of the technology described herein can be loaded with new input data values in advance of being needed, e.g., and in an embodiment, as a "background" process. Thus, embodiments of the technology described herein can operate so as to split the loading (fetching) of input data values into the (local) storage used by the execution unit, from the execution of instructions by the execution unit, thereby allowing data fetching to be performed (sufficiently) in advance of when data values are needed for data processing operations so as to hide any memory access (fetch) latency. This may reduce the occurrence of stalls when performing processing for a program. The amount of storage provisioned for the data source can also be varied (increased and/or decreased), e.g. in use, to help hide latency.

Alternatively, or additionally, for a data source to which the execution unit is to write output data values generated when executing instructions, space which is 'freed up' by controlling the storage in the manner of the technology described herein can then be used for writing new output data values generated as a result of executing instructions to the storage.

The data processing system in accordance with the technology described herein can be any suitable and desired data processing system comprising a data processor operable to execute a program.

The data processing system may be implemented as part of any suitable electronic device, e.g., such as a desktop computer, a portable computing device (such as a laptop, mobile phone, tablet, wearable computing device, or other portable device), robotic device, or a purpose-built computing device (for example, a computing device for use in medical or other scenarios). Thus the technology described herein also extends to an electronic device that includes the data processing system of the technology described herein (and on which the data processing system operates in the manner of the technology described herein).

The data processing system may be implemented as part of a computing system comprising one or more electronic devices, e.g., such as a distributed computing system (such as a cloud computing system).

The data processing system may comprise any desired components and elements that a data processing system can comprise, such as one or more or all of: a display processor (display processing unit, DPU), a central processing unit (CPU), a graphics processor (graphics processing unit, GPU), a video processor (video processing unit, VPU), a sound processor, an image signal processor (ISP), a digital signal processor (DSP), one or more neural network processors (neural network processing units, NPUs), a display and a memory.

The data processor which is operated in the manner of the technology described herein can be any desired and suitable data processor that can execute program instructions. The data processor may be, for example, a central processing unit (CPU), a graphics processor (graphics processing unit, GPU), a vector processor, a video processor (video processing unit, VPU), a sound processor, an image signal processor (ISP), a digital signal processor (DSP), a neural network processor (neural network processing unit, NPU) adapted for performing neural network processing (e.g. such as machine learning, ML), an accelerator, or any other suitable and desired processor. The data processor may be integrated within a system-on-chip (SoC).

The data processor is in an embodiment a data processor that can perform vector (single instruction multiple data, SIMD) processing, or single instruction multiple thread (SIMT) processing (in which instructions for a plurality of threads are executed in lockstep). Such a data processor may be, for example, any of the processors mentioned above.

In an embodiment, the data processor is a graphics processor (graphics processing unit (GPU)) which is capable of performing (configured to perform) graphics processing operations, and in an embodiment on which machine learning processing (e.g. deep learning, neural network processing) can additionally be performed. Alternatively, the processor could be any other suitable and desired processor on which machine learning processing can be performed (for example a CPU, or neural processing unit (NPU)).

The data processor comprises an execution unit operable to execute instructions in a program to be executed, to perform data processing operations for execution threads executing the program.

The data processor may comprise a single execution unit, or may have plural execution units. In embodiments, for example where the data processor is a graphics processor or a CPU, the data processor (graphics processor) may comprise one or more processing cores each having a respective execution unit or units.

In embodiments, a (and in an embodiment each) execution unit performs data processing operations for one or more sets (groups) of execution threads (a group of threads may be referred to herein as a 'warp' of threads), in an embodiment with the instructions being performed in lockstep across each group of threads.

Where there are a plural execution units, each execution unit can in an embodiment operate in the manner of the technology described herein.

Where there are plural execution units, each execution unit may be provided as a separate circuit to other execution units of the data processor, or the execution units may share some or all of their circuits (circuit elements).

The or each execution unit may, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, multiply-accumulate (MAC) etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units in the case of a graphics processor), etc.

The functional units can be implemented as desired and in any suitable manner. They will comprise (be implemented as) suitable hardware elements such as processing circuits (logic).

In embodiments, the data processor is a processor on which machine learning (in an embodiment neural network processing) is to be performed (for example, a graphics processor, CPU, NPU or other suitable and desired processor). In embodiments, the processor that executes the machine learning processing in an embodiment comprises, inter alia, processing circuit(s) configured to apply a filter (set of weights or "kernel" of a weight data array) to an input data array (an "input feature map"), and in an embodiment to perform a weighted sum using input feature map data values and weight data values.

In an embodiment, the processor is configured to perform a weighted sum as a multiply-accumulate operation, and accordingly the processor comprises one or more multiply-accumulate circuits (otherwise known as a multiplier-accumulator, or an "MAC unit") and/or one or more dot product units (circuits) (DPUs) for performing, inter alia, multiply-accumulate operations.

The data processor may also comprise one or more of, and in an embodiment all of: an instruction decode circuit or circuits operable to decode instructions to be executed so as to cause the execution unit(s) to execute the required instructions; an instruction fetch circuit or circuits operable to fetch instructions to be executed (prior to the decode circuit(s)); an instruction cache; and an execution thread generator and scheduler (spawner) that generates (spawns) threads for execution.

The program to be executed may be any suitable and desired program which the data processor can execute. In embodiments, the program is a machine learning program, for example which generates a useful output using neural network processing. In embodiments, the program comprises processing to be performed for an application (e.g. a game, Extended Reality (xR) application (for example an application using, Augmented Reality (AR) application, Virtual Reality (VR), Mixed reality (XR), an image signal processing application, etc.) or other application), the application in embodiments executing on a host processor (e.g. CPU) of the data processing system.

The program being executed should, and in an embodiment does, comprises a sequence of instructions to be executed. The set (sequence) of instructions for the program can comprise any desired and suitable instructions.

The program instructions (which may be provided with the indications described herein) may comprise, for example, one or more or all of: arithmetic (mathematical) operations (add, subtract, multiply, divide, multiply-accumulate (MAC) etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions in the case of graphics processing).

In embodiments where the program is for performing machine learning operations (in an embodiment for performing neural network processing), the program instructions (which may be provided with the indications described herein) in an embodiment comprise instructions which when executed cause a filter (set of weights or "kernel" of a weight data array) to be applied to an input data array (an "input feature map"), in an embodiment so as to perform a weighted sum using input feature map data values and weight data values, in an embodiment using multiply-accumulate data processing operations.

Thus, in embodiments where the program is for performing machine learning operations (in an embodiment for performing neural network processing), the program instructions in an embodiment comprise one or more multiply-accumulate instructions.

The data processor comprises storage operable to store data values for use by the execution unit when executing instructions to perform data processing operations. Said storage is (accordingly) accessible to the execution unit for use when performing data processing operations. The execution unit is operable to read input data values from said storage, and in an embodiment also operable to write output data values (for example generated when performing data processing operations) to said storage.

The storage may be any suitable and desired storage (directly) accessible to the execution unit(s), in an embodiment local to the data processor comprising the execution unit, in an embodiment integrated within the data processor. The storage may be on-chip storage. In an embodiment the storage comprises RAM, in an embodiment SRAM. The storage may comprise register storage.

Where there are plural execution units in the data processor (for example, within respective processing cores), each execution unit may have its own storage for use when executing instructions (for example its own dedicated register storage). Alternatively, (at least some) storage may be shared between plural (e.g. some or all) of the separate execution units.

In the technology described herein, instructions in a program to be executed can (may) indicate one or more data sources of the storage accessible to the execution unit for use when performing a data processing operation.

The one or more data sources indicated for use when performing a data processing system may comprise one or more data sources from which the execution unit is to read one or more input data values and/or one or more data sources of the storage accessible to the execution unit to which the execution unit is to write one or more output data values generated by the execution unit when performing data processing operations. The instruction may indicate whether a (and in an embodiment each) data source indicated is to be used for input data values or for output data values (or for both input and output data values).

Alternatively or additionally, (at least some) output data value(s) generated by the execution unit may not be written to said storage, for example being (instead) broadcast to or streamed to (for use by) another consumer (circuit) (for example, another execution unit, data processor, or data processing system). Accordingly, in embodiments an instruction can indicate that output data value(s) generated when performing data processing operations are not to be written to said storage.

The storage accessible to the execution unit in an embodiment comprises one or more (in an embodiment plural) different data sources (locations) in which data values can be stored (from which data values can be read and/or to which data values can be written by the execution unit).

The one or more data sources indicated in an instruction may comprise one or more of a plurality of data sources of the storage accessible to the execution unit. Thus, in an embodiment, the storage accessible to the execution unit comprises a plurality of data sources (to from which data values can be read and/or to which data values can be written by the execution unit).

A (each) data source (location) may correspond to a respective part of the storage, such that different data sources correspond to different parts of the storage. For example, a (each) data source may correspond to a region of the storage comprising a set of storage locations (positions in storage) in which data values can be stored, the set of storage locations being assigned to (provisioned for) that data source. The region of storage (set of storage locations) may be defined between (for example comprise contiguous storage locations between) a start (base) storage location (address) and an end storage location (address). The region of the storage (set of storage locations) assigned is in an embodiment different, in an embodiment non-overlapping, for different data source(s).

In an embodiment, one or more of the data sources of the storage are respective register(s) (register file(s)) of the storage.

The indication in an instruction of the data source(s) of the storage from which the execution unit is to read input data value(s) (or to which the execution unit is to write output data value(s)) may be any suitable and desired indication.

In an embodiment, the indication comprises an identity of (identifier for) a data source (for example comprising, when a data source is a register, an identifier for the register). In this regard, one or more (or in an embodiment all) data sources accessible to the execution unit may be associated with a respective (unique) identifier, which can be provided (indicated) in instruction(s) to indicate that the data source is to be used.

Alternatively, a data source could be identified in an instruction by reference to a storage location falling within that data source (for example a start (base) storage address for the data source).

In addition to indicating one or more data sources to be used for input data values, instructions can in an embodiment also indicate which input data values are to be read from the data source(s). When an instruction indicates one or more data sources to which output data values are to be written, the storage location(s) within the data source(s) to which the output data values are to be written could likewise be indicated. This may be done in any suitable and desired manner, for example, by indicating the desired storage location(s) within the data source, from which the input data value(s) are to be read (or output data value(s) are to be written). The storage location(s) could be indicated, for example, as an offset within the data source, for example compared to the base (start) storage address for the data source, or (in an embodiment and as will be discussed in more detail below) as an offset from a storage address in the data source (which may not be the base (start) storage address for the data source, but e.g., and in an embodiment, a current "head" address for the data in the data source).

It would also be possible for instruction(s) to indicate (instead of or in addition to a data source from which data value(s) are to be read), one or more input data values in the instruction itself (such that the instruction contains one or more hard-coded input data values). Thus, instructions could require (and the execution unit, when performing data processing operations could use) a mixture of hard-coded input data values and input data values to be read from indicated data source(s).

Instructions in the program to be executed, in embodiments in an embodiment (also) indicate (comprise an indication indicating) a data processing operation to be performed by the execution unit when the instruction is executed (that in an embodiment uses data in the indicated data sources).

For example, as discussed above, the data processing operation to be performed (and which may be indicated in the instruction) may comprise any one or more of: arithmetic operations (for example, add, subtract, multiply, divide, multiply-accumulate (MAC) etc.); bit manipulations (for example, invert, swap, shift, etc.); logic operations (for example, AND, OR, NAND, NOR, NOT, XOR, etc.); load-type instructions (for example, such as varying, texturing or load instructions in the case of graphics processing); and store type instructions (such as blend or store instructions in the case of graphics processing). For a program to be (being) executed which performs machine learning, in an embodiment one or more instructions indicate (specify) that a multiply-accumulate operation is to be performed.

In embodiments, the execution unit of the data processor is configured to, when executing an instruction indicating one or more data sources storing input data values to be used when executing a data processing operation (and which instructions in an embodiment also indicate a data processing operation to be performed), read one or more input data values from the indicated one or more data sources and perform a data processing operation (in an embodiment a data processing operation indicated in the instruction) using the read input data values. The execution unit is in an embodiment configured to, also, when executing an instruction which indicates one or more data sources to which one or more output data values are to be written, write output data value(s) generated (when performing, for example, the data processing operation indicated in the instruction) to one or more data sources indicated in the instruction for use when storing output data values.

In accordance with the technology described herein, instructions in a program to be executed, (in addition to indicating one or more data sources from which input data value(s) are to be read for performing a data processing operation, and/or indicating one or more data sources to which output data value(s) are to be written, and in an embodiment also indicating which data processing operation is to be performed), can also indicate that one or more of the indicated data sources contain data value(s) that are no longer required to be retained.

In other words, an instruction requiring use of a particular, indicated, data source (for reading input data values from and/or writing output data values to) can also indicate whether that same data source contains data value(s) which are no longer required to be retained.

For the sake of conciseness, we may refer herein to indication(s) that one or more of the indicated data sources contain data value(s) that are no longer required to be retained as 'no longer required to be retained' indications.

In an embodiment, a respective indication that one or more data values are no longer required to be maintained (a respective 'no longer required to be retained' indication) can be (is) provided in an instruction for respective data source(s) in which data value(s) are no longer required to be retained (so that one indication per data source can be provided).

In the technology described herein, the data processing system controls storage of data values in the storage in response to the execution unit executing an instruction indicating that one or more data values in an indicated data source (from which input data value(s) are to be read, or to which out data values are to be written) are no longer required to be retained.

The data processing system may comprise a suitable control circuit (for example, a storage management circuit) for controlling the storage of data values in the storage in response to 'no longer required to be retained' indications. The storage management circuit may be provided as part of the data processor (e.g. GPU), for example as part of a (each) shader core or for example as part of the execution unit itself, or as part of any other suitable and desired part of the data processing system.

In an embodiment only part of (less than the entirety of) the storage accessible to the execution unit is controlled (by the storage management circuit) in response to 'no longer required to be retained' indications in instructions.

Accordingly, in embodiments, controlling storage of data values in the storage, based on an indication in an instruction that one or more data values in a data source are no longer required to be retained, is performed by the data processor for only part of the storage.

The part of the storage which is controlled in response to 'no longer required to be retained' indications may be one or more of (but not all of) the data sources of the storage accessible to the execution unit (which data source(s) may be as described herein). Accordingly, in embodiments (only) a sub-set of a plurality of data sources accessible to the execution unit are controlled in response to 'no longer required to be retained' indication(s) (and the storage management circuit of the data processor is in an embodiment configured to control only a sub-set of the data sources accessible to the execution unit).

The part of the storage (sub-set of data sources) which is controlled in response to 'no longer required to be retained' indications, in an embodiment comprises (in an embodiment consists of) one or more registers. Accordingly, in embodiments, 'no longer required to be retained' indication(s) are permitted to be provided in instruction(s) (e.g. a compiler when compiling the program is configured to include 'no longer required to be retained' indication(s) in instructions) only in respect of the part of (in an embodiment a sub-set of the data sources of, in an embodiment one or more registers of) the storage accessible to the execution unit.

In embodiments where the data processor is a graphics processor, the part of the storage controlled in response to 'no longer required to be retained' indications in embodiments comprises (at least part of) any of: a tile buffer, a Load Store Cache (LSC), or other storage (for example other storage which is part of, or available to, a processing core of the graphics processor). In this regard, the Applicant has recognised that existing storage (e.g. an existing tile buffer) can be controlled in the manner described herein, for example by augmenting the (existing) control circuit for that storage (the existing control circuit then forming part of the storage management circuit). The part of the storage (for example the existing storage) controlled in response to 'no longer required to be retained' indications may comprise register storage, and is in an embodiment SRAM storage.

For programs for performing machine learning, for example using neural network processing) the part of the storage which is controlled in response to 'no longer required to be retained' indications may store at least part of any of: an input feature map to be processed; a weight data array for use during processing; and an output feature map generated during processing.

In embodiments, part of the storage accessible to the execution unit is not controlled in response to (is controlled without reference to) 'no longer required to be retained' indications (in an embodiment, with the storage management circuit having no control over this part of the storage). This part of the storage may be one or more, or all, data sources other than the sub-set of data sources controlled in response to 'no longer required to be retained' indications.

In an embodiment, 'no longer required to be retained' indication(s) are not provided in (are not permitted to be provided in) instructions (e.g. by a compiler) in respect of the part of storage (the data source(s)) which are not controlled based on 'no longer required to be retained' indications.

The part of the storage which is not controlled in response to 'no longer required to be retained' indications may comprise one or more 'normal' registers, which are controlled by the data processing system in a 'normal' way.

In an embodiment, the part of the storage which is not controlled in response to 'no longer required to be retained' indications (the 'normal' registers) are loaded with new data in response to (separate) load instructions. Data values are in an embodiment written out from the part of the storage which is not controlled in response to 'no longer required to be retained' indications (the 'normal' registers) in response to (separate) store instructions. In this regard, the load (or store) instruction(s) in an embodiment indicate that a load (or store) operation is to be performed for one or more data values, without any other (e.g. arithmetic) data processing operation being performed for the data values.

Alternatively, or additionally, new data may be loaded into and/or output (written out) from this part of the storage (the 'normal' registers) by any other suitable and desired 'normal' means for loading data, for example such as by broadcasting or streaming data.

In an embodiment this part of the storage is (these 'normal' registers are) controlled by the data processing system so that data can be loaded into and/or read from, any desired storage location (falling within the 'normal' register(s)).

Thus the data processing system may comprise (a mixture of) one or more data sources which are (of a type) controlled in response to 'no longer required to be retained' indications, and one or more data sources which are (of a type) not controlled in response to 'no longer required to be retained' instructions. Each data source (regardless of type) may be used for storing input data values to be read when executing instructions, output data values generated when executing instruction (or a combination of both input and output data values).

In embodiments, the data processing system is configured to, in response to the execution unit executing an instruction indicating one or more data sources from which the execution unit is to read one or more input data values (or indicating one or more data sources to which the execution unit is to write one or more output data values), determine whether the data source(s) indicated in the instruction are to be (are part of the storage which is, in an embodiment fall within the sub-set of data sources that are) controlled based on 'no longer required to be retained' indication(s).

When the data processing system determines that a data source indicated in an instruction is to be (is part of the storage which is) (is of a type which is) controlled based on a 'no longer required to be retained' indication, the data processing system (then) controls the storage of data values in that data source based on 'no longer required to be retained' indication(s) in the instruction (in an embodiment, based on any 'no longer required to be retained' indication applying to that data source).

In embodiments, when the data processing system determines that a data source is not to be (is part of the storage which is not) (is of a type which is not) controlled based on 'no longer required to be retained' indication(s), the data processing system then controls that data source without reference to (in an embodiment without checking for) any 'no longer required to be retained' indication(s) in respect of that data source.

The data processing system may determine whether a data source indicated in an instruction is to be (or is not to be) controlled based on 'no longer required to be retained' indication(s) in any suitable and desired way.

In embodiments, an instruction may include, for a (each) data source indicated in the instruction, an (additional) indication of whether or not the data source is to be (is of a type that is to be) controlled based on 'no longer required to be retained' indications. This indication may be, for example, a flag within the instruction. A value of high magnitude (e.g. 1 or −1) for the indication (flag) may indicate that the data source is to be (is of a type that is to be) controlled based on 'no longer required to be retained' indications, whereas a value of low magnitude (e.g. 0) for the indication (flag) may indicate that the data source is not to be (is not of a type that is not to be) controlled based on 'no longer required to be retained' indications, or vice versa.

Alternatively, or additionally, an indication of whether or not the data source to be used is of the type controlled in response to 'no longer required to be retained' indications could be provided in the instruction opcode (indicating the data processing operation to be performed).

Alternatively, it would be possible for the data processing system to determine whether a data source indicated in an instruction is to be (or is not to be) controlled based on 'no longer required to be retained' indications based on other information (e.g. metadata) accessible to the data processing system for the data source, for example associated with the data source in question.

The controlling storage of data values in storage (by the storage management circuit) based on 'no longer required to be retained' indications may be any suitable and desired control which removes/retires from use data value(s) which are no longer required to be retained.

In the case of a data source storing input data value(s) to be read by the execution unit, the 'no longer required to be retained' indication may be used to remove/retire from use input data value(s) which are no longer required to be read by the execution unit when executing data processing operations. In this case, the control in response to a 'no longer required to be retained' indication in an embodiment comprises invalidating the data value(s) which are indicated as being no longer required to be retained, in an embodiment by making those data value(s) inaccessible for reading by the execution unit.

Thus, in an embodiment, the execution unit is prevented (prohibited) from reading (is not permitted to read) input data value(s) which are indicated as being no longer required to be retained. Input data values which are no longer required to be retained are however, in an embodiment, permitted to be overwritten (as will be discussed herein, this can allow new input data values to be loaded into the data source, e.g. from memory, e.g. as a background process, by overwriting input data values which are no longer required to be retained).

Thus, the storage location(s) storing input data value(s) no longer required to be retained are made inaccessible (to the execution unit) for reading, in an embodiment such that the execution unit can (at least temporarily) no longer read input data value(s) from those storage location(s), in an embodiment at least until those storage location(s) are populated (overwritten) with new data value(s). Storage location(s) which are made inaccessible for reading by the execution unit are (however) in an embodiment permitted to have (new) input data values written to them by the data processor.

In the case of a data source storing output data value(s) generated by the execution unit, 'no longer required to be retained' indication(s) may be used to remove/retire from use output data value(s) which are ready to be output (e.g. written out to storage such as main memory, or otherwise output such as by broadcasting). In this case, the control in response to a 'no longer required to be retained' indication in an embodiment comprises permitting the data value(s) which are indicated as being no longer required to be retained to be output.

It would be possible to trigger writing out of output data value(s) directly in response to a executing an instruction having a 'no longer required to be retained' indication (and in some embodiments this is done). However, in an embodiment, (as will be discussed herein) output data value(s) which are indicated as being 'no longer required to be retained' in instructions that are executed, are then output (e.g. written out to memory) according to a background process (so that they are not necessarily output immediately in response to executing the instruction).

In an embodiment, in the case of a data source storing output data value(s), data values indicated as 'no longer required to be retained' (ready to be output) are not permitted to be overwritten (at least until they are output). Thus, in an embodiment, the execution unit is prevented (prohibited) from overwriting (is not permitted to overwrite) output data value(s) which are indicated as being 'no longer required to be retained' (at least until they are output).

Thus, storage location(s) storing output data value(s) indicated as being 'no longer required to be retained' are made inaccessible (to the execution unit) for writing to, in an embodiment such that the execution unit can (at least temporarily) no longer write output data value(s) to those storage location(s).

In embodiments, the data processing system (storage management circuit) is configured to, for data source(s) which are controlled based on 'no longer required to be retained' indications, maintain a set of zero or more data value(s) which are required to be retained.

In the case of a data source storing input data value(s), the data value(s) required to be retained are in an embodiment valid input data values, in an embodiment which are permitted to be read by the execution unit (but are in an embodiment not permitted to be overwritten).

This may be achieved through control of the data source by (the storage management circuit of) the data processing system, for example such that when new input data values are loaded into a data source (e.g. from main memory, e.g. as a background process) they are not permitted to be loaded into storage locations containing data values which are required to be retained.

In the case of a data source storing output data value(s), the data value(s) required to be retained are in an embodiment data values which are not yet ready to be output (to main memory). The execution unit may be permitted to overwrite data values 'required to be retained', which for example may comprise partial output results, which may be overwritten with newly generated partial output results, for example until a final output data value is generated by the execution unit which is ready to be output (e.g. written out to memory). For example, a partial output result for a multiply-accumulate operation may be overwritten as newly generated output data value(s) is calculated and accumulated with the existing stored data value.

The data values of the set of data values which are required to be retained may be stored in a set of (respective) storage locations (addresses) in the data source.

Accordingly, the data processing system (storage management circuit) may be configured to maintain a set of zero or more storage locations storing the data value(s) which are required to be retained.

It may arise that the data values which are 'required to be retained' do not consume (do not occupy) all of the storage locations (capacity) assigned to the data source. As such, a data source may comprise a set of (zero or more) storage locations which do not store data values which are 'required to be retained'.

Consistent with the above discussion, in the case of a data source storing input data value(s), the storage locations storing data values which are required to be retained are in an embodiment accessible for reading (by the execution unit), and in an embodiment not permitted to be written to (overwritten). (Whereas the storage locations which do not store data values required to be retained are in an embodiment inaccessible for reading by the execution unit, but are in an embodiment permitted to be written to (overwritten) when loading new input data values into the data source).

In an embodiment data source(s) which are controlled based on 'no longer required to be retained' indications in instructions comprise (are controlled so as to comprise) a queue of data values required to be retained. Accordingly, the set of data values required to be retained in an embodiment comprises a queue of data values.

The queue of data values in an embodiment has a head and a tail, with data value(s) in an embodiment being removed from the head of the queue (only), and in an embodiment being added to the tail of the queue (only).

For example, in the case of a data source storing input data value(s) new input data values loaded into the data source may be added to the tail of the queue, whereas input data values which are 'no longer required to be retained' are removed from the head of the queue. In the case of a data source storing output data value(s), output data value newly generated by the execution unit may be added to the tail of the queue (or may overwrite an existing partial output result within the queue, e.g. at the tail of the queue), whereas output data values which are 'no longer required to be retained' are removed from the head of the queue.

(Thus) in an embodiment, data value(s) in the queue are in order, from head to tail, of oldest (least recently added) to newest (most recently added). In this regard, data values are in an embodiment added to, and removed from, the queue on a first-in-first out basis. Accordingly, in an embodiment the queue is a first-in-first-out (FIFO) queue.

In an embodiment, the data value(s) in the queue are stored in-order in the storage locations of (assigned to) the data source, in an embodiment such that data values which are adjacent in the queue are stored in adjacent (contiguous) positions in storage.

Thus, in an embodiment the storage locations storing the queue of data values store data values which are 'required to be retained'.

The queue of data values may occupy (take up) only part of (less than all of) the storage locations assigned to the data source. As such, (any) storage locations not storing data values within the queue accordingly do not store data values which are 'required to be retained'.

The head and tail of the queue may be identified in any suitable and desired manner. In an embodiment, the data processing system (storage management circuit) maintains (stores) a pointer to the data value at the head of the queue (pointing to the storage location in the data source which stores the data value at the head of the queue) and a pointer to the data value at the tail of the queue (pointing to the storage location in the data source which stores the data value at the tail of the queue). The head and tail pointers may comprise (point to) an exact storage location (storage address) of the head and tail of the queue respectively, or may (and in an embodiment do) provide the head and tail of the queue as a storage location offset relative to a base (start) storage location (storage address) for the data source.

In an embodiment, (in response to an instruction being executed by the execution unit indicating that one or more data values in the data source are no longer required to be retained) the data processor (storage management circuit) is configured to identify that one or more data values at the head of the queue are no longer required to be retained, and remove those one or more data values from the head of the queue.

In embodiments, this is done by moving (updating) the head pointer, so as to exclude from the queue those data value(s) no longer required to be retained (and accordingly exclude from the set of storage locations storing data values required to be retained those storage locations storing those data value(s) no longer required to be retained). In other words, the head pointer is in an embodiment shifted so that the data value(s) no longer required to be retained no longer fall between head and tail pointers.

Moving the head pointer in this way has the effect of 'shifting' the set of data values which are accessible to the execution unit (which fall between the head and tail pointers), without the need to physically move data values within storage. That said, it would equally be possible to remove data values from the head of the queue by physically shifting (moving) data values in the data source relative to the head pointer, and in other embodiments this is done.

Thus, in embodiments, the 'no longer required to be retained' indication can be seen as triggering a 'shift' operation being performed by the data processing system (storage management circuit) which removes one or more data values from the head of the queue of data values accessible for reading by the execution unit.

Regarding the control of the data source(s) in response to 'no longer required to be retained' indications described herein, the Applicant has recognised that, since input data values may be used by a program (e.g. such as a program performing neural network processing) in a predictable order, with data values falling out of use in a predictable order, it is possible to control which data values are 'required to be retained' by maintaining a first-in-first out queue of data values, stored in-order in storage, with data values being removed from the set of data values 'required to be retained' (simply) by removing the data values from head of the queue. This may provide a simpler and more efficient way of controlling storage of data values as compared to, for example, storing data values out-of-order in storage and controlling individual storage locations when the data values therein are no longer required to be retained (e.g. when an input data value falls out of use, or an output data value can be output), and maintaining a record for individual respective storage location(s). However, that could be (and in embodiments is), instead, done if desired.

Furthermore, by controlling data source(s) in response to 'no longer required to be retained' indications in instructions as described herein, instructions requiring data input values from a data source controlled in response to 'no longer required to be retained' indications can simply access data values from the set of accessible storage locations (from the queue of data values). In this way, it may not be necessary to configure instructions to avoid reading certain (e.g. invalid) data values.

In embodiments, as discussed above, an instruction requiring an input data value to be read from a data source may indicate which data value is to be read (e.g. by indicating which storage location the data value is to be read from). For a data source which is (part of the storage which is) controlled in response to 'no longer required to be retained indications', in an embodiment only data value(s) within the set of data values accessible for reading by the execution unit (in an embodiment forming a queue, defined between head and tail pointers) can be read. In an embodiment any data value (a data value at any position (storage location)) within the set (queue) of data values accessible for reading by the execution unit can be read.

In an embodiment, a (any) instruction requiring an input data value to be read from a data source which is controlled in response to 'no longer required to be retained indications' indicates the storage location from which the input data value is to be read as relative position within the set of storage location(s) storing the set of data value(s) accessible for reading by the execution unit (in an embodiment as an offset from the head of the queue of data value(s) accessible for reading by the execution unit).

Thus, whilst the data processing system in embodiments removes (makes inaccessible) data values (only) from the head of the queue, the execution unit can in an embodiment read any input data value (an input data value at any position) in the queue of data values stored in the data source (and so the execution unit is not limited to reading only the data value at the head or tail of the queue).

In embodiments, an instruction requiring an output data value to be written to a data source may indicate which storage location the output data value is to be written to. For a data source which is controlled in response to 'no longer required to be retained indications', the storage location indicated for writing an output data value to may be a storage location which does not store an output data value which is 'required to be retained' (is a storage location falling outside the queue). For example, and in an embodiment, the storage location indicated in the instruction for writing the output data value to is the next storage location after (adjacent to) the storage location at the tail of the queue of data values required to be retained.

Alternatively, the storage location indicated in the instruction for writing the output data value to could be at the tail of the queue of data values (so as to overwrite a data value at the tail, and thereby replace the oldest data value currently stored, for example so as to overwrite a partial output result). In an embodiment, the storage location does not fall before the tail of the queue of data values.

The storage location indicated in the instruction for writing the output data value to may be indicated as a relative position within the set of storage location(s) storing the set (queue) of data value(s) required to be retained (in an embodiment as an offset from the head of the queue of data value(s) accessible for reading by the execution unit). Alternatively, the storage location could be indicated as an offset relative to the tail of the queue.

When an instruction requires an output data value to be written to a storage location falling after the tail of the queue, the data processing system (storage management circuit) may first check whether there is space in the storage to write the data values (for example checking the storage location does not currently store a data value which is required to be retained) before permitting the output data value to be written to storage. This may be checked by determining, for example that: (tail+base)−(head+base)>0 (i.e. checking that the number of data storage locations storing (valid) data values in the queue is less than the number of data storage locations assigned to the data source).

In response to a data value being written to a data location falling after the tail of the queue, the data processing system (storage management circuit) may update the tail of the queue so as to encompass the newly written data value within the queue of (valid) data values.

In an embodiment the (each) data source controlled in response to 'no longer required to be retained' indications is maintained (managed) as circular storage. In this regard, in an embodiment the data source comprises an assigned region of storage (set of storage locations) in which data values can be stored, between a start storage location (base storage address) and an end storage location (end storage address). In an embodiment, when the head (or tail) pointer for the queue of data values accessible for reading is moved beyond the start storage location it will continue from (return to) the end storage location (and conversely when moved beyond the end storage location it will continue from (return to) the start storage location). This allows for continuous, uninterrupted, moving (shifting) of the head (and tail) pointer.

Alternatively, in the case that data values are physically shifted within the storage, then, for a data source maintained as circular storage, a data value shifted past the end storage location will move to (return to) the start storage location (and conversely a data value shifted past the start storage location will move to (return to) the end storage location).

When managed as circular storage, storage locations storing the queue of data values accessible to the execution unit (which, as discussed above, may be a set of contiguous storage locations between the head and tail pointer) may (therefore) bridge the start and end storage locations of the data source.

In embodiments, the data processing system may be permitted to vary (select) a number of data values in a data source which are indicated as being 'no longer required to be retained' by an instruction (and accordingly vary the number of data values removed from the set of data values required to be retained in response to executing an instruction). The number of data values made inaccessible may be, for example, vary between (be selected from) any of: one, two, three or more data values.

Thus, in an embodiment, the number of data values removed from (shifted from) the head of the queue of data values in the data source (and in an embodiment the number of storage locations by which the head pointer is moved) is in an embodiment permitted to vary. For example, the head pointer may be moved by any of: one, two, three or more data values (storage locations).

The data processing system (storage management circuit) may be configured to determine (select) the number of data values in a data source removed from the set of data values which are 'required to be retained' (removed from the head of the queue of data values) based on the instruction being executed by the execution unit.

It would be possible, for example, for an instruction to indicate (contain an indication of) a number of data values to be made inaccessible for reading in a data source (for example, by indicating a 'shift' amount), and in embodiments this is done.

Alternatively, and in an embodiment, the data processing system (storage management circuit) is configured to, in response to a 'no longer required to be retained' indication in an instruction, remove from the set of data values which are required to be retained (shift out of the queue) all data values which are older than (closer to the head of the queue than) the input data value which is to be read from (or output data value which is to be written to) the data source when executing the instruction. The data processing system (storage management circuit) in an embodiment also removes from the set of data values required to be retained the data value which is indicated to be read (after the execution unit has read it) or the data value to be written to the data source (after the execution unit has written it to the data source). In this way, any older data values can be cleared from the data source once an appropriate instruction in the sequence of instructions is reached.

In such embodiments, the number of data values removed from the set of data values which are required to be retained (shifted out of the queue) (accordingly) depends on which storage location the instruction causes the execution unit to read a data value from (or write a data value to).

This may be achieved by the data processing system (storage management circuit), for an instruction indicating the location from which an input data value is to be read (or to which an output data value is to be written) as an offset (offset amount) from the head of the queue, moving the head (head pointer) of the queue by the offset amount.

It will be appreciated that, for instructions which when executed do not require removal ('shifting') of data values from the set of data values required to be retained, then a 'no longer required to be retained' indication is not needed, and can be omitted.

In embodiments, the indication that one or more data values are no longer required to be retained (the 'shift' indication) is a modifier to the instruction(s) of the program, is included in an instruction (only) when required (and not included when not required). (This is in comparison to, for example, a flag which must always assume a value, e.g. 0 or 1). In embodiments, a respective modifier is included in the instruction for each data source in which data is no longer required to be retained.

Alternatively, in embodiments, instruction(s) may contain a field (e.g. flag) which indicates whether or not more data values are no longer required to be retained.

As discussed above, in the case of a data source storing input data values to be used when performing data processing operations, rendering input data values as 'no longer required to be retained' (in response to 'no longer required to be retained' indications in instructions) (performing 'shift' operations) in effect 'frees up' storage locations for loading new input data values into the data source.

In this regard, "loading" data values into a data source in an embodiment comprises populating the data source with data values that are expected to be (will be) used as input data values for data processing operations performed by the execution unit in response to executing instruction(s), in an embodiment in advance of those data values being required for data processing operations. (This is in contrast to "writing" data values into a data source, which may more broadly relate to acts in which a data value is written to the data source, which may occur for example when a data processing operation generates an output data value which is written to a data source.)

In an embodiment the data processing system (storage management circuit) is configured to load one or more (at least some) new input data values into a data source controlled in response to 'no longer required to be retained' indications as a background process, in an embodiment with loading being performed independently of (without consideration of, and not in direct response to) the execution of instructions containing 'no longer required to be retained' indications for the data source. When a data source stores (only) data values which are to be used as input data values for processing operations by the execution unit, in an embodiment all new data value(s) are loaded into the data source as a background process.

In an embodiment, the data processing system (storage management circuit) is configured to load new data value(s) into a (any) data source controlled in response to 'no longer required to be retained' indications in advance of the data value(s) being required (as input data value(s) for data processing operations by the execution unit in response to instructions in the program being executed). In this regard, the Applicant has recognised that programs, for example such programs for performing neural network processing, may require input data values in a predictable, in an embodiment predetermined, order, and so it is possible to load data value(s) into storage in advance of being needed.

In an embodiment, for data source(s) storing input data values which are to be read by the execution unit when performing data processing operations, data values loaded into the data source (by the storage management circuit) are written (only) to the (set of) storage location(s) not storing data values required to be retained (which are inaccessible for reading by the execution unit).

In an embodiment, the data processing system (storage management circuit) is configured to load new input data value(s) to the next storage location (or next storage locations, in the case of plural new data values) after (adjacent to) the storage location at the tail of the queue of data values.

In other words, for a data source which is controlled in response to 'no longer required to be retained' indications (and which is used to store input data values to be read by the execution unit when performing data processing operations), in an embodiment the data processing system (storage management circuit) is configured to load (new) data values (only) after the tail of the queue data values required to be retained.

In an embodiment, new data value(s) which are loaded into a data source are required to be retained (until an indication in an instruction indicates otherwise). Accordingly, the data processing system (storage management circuit) is configured to make (the storage locations storing) new data value(s) (immediately) accessible to the execution unit for reading (but not permitted to be overwritten). In an embodiment, this is done by updating the tail pointer so that the newly added data value(s) fall between the head and tail pointers for the queue.

Whilst it would be possible to load new input data values singly (one-by-one) into a data source controlled in response to 'no longer required to be retained' indications, the Applicant has recognised that it may be more efficient, for example from the perspective of bandwidth and processing capacity consumed, to load multiple new data values into the data source at a time (in other words, to load new data values in batches, each batch comprising multiple data values).

Thus in an embodiment the data processing system is configured to load multiple input data values (a batch of input data values) at a time (at once), into a (any) data source controlled in response to 'no longer required to be retained' indications.

In an embodiment the size of a (each) batch of data values is a defined, in an embodiment predetermined size for a (each) data source. The batches (each batch) loaded for a (particular) data source may be (and in embodiments are restricted to being) the same size, for example comprising the same number of data values. The size of batches loaded could be (and in embodiments is), however, permitted to differ between different data sources.

The size of a (each) batch of data values is in an embodiment based on, in an embodiment corresponds to, the size of a memory "transaction" in the data processing system in operation, such as, and in an embodiment, the size of a cache line. For example, the size of a (and each) batch of data values may be, for example, 32 bytes, or in an embodiment 64 bytes in size. The Applicant has recognised that a size of 32 bytes, or 64 bytes may provide a good loading efficiency (since cache lines of the storage from which data values are to be loaded may likewise have a size of 32 or 64 bytes), without introducing excessive delays whilst waiting for enough 'free' space in the data source into which the batch of data values are to be loaded.

In an embodiment, the data processing system is configured to load one or more (in an embodiment multiple, in an embodiment a batch of) input data values into a data source (only) when there sufficient space to write those data values(s) into storage location(s) not occupied by data values which are required to be retained.

Thus, in an embodiment, the data processing system is configured to load one or more (in an embodiment multiple, in an embodiment a batch of) input data values into a data source (only) when there is at least a threshold amount of space (at least a threshold number of storage locations) not occupied by data values which are required to be retained. Accordingly, the data processing system (storage management circuit) may be configured to load new input data value(s) (in an embodiment as a batch) into a data source (only) when the set of storage locations not storing data values required to be retained is at least of a threshold size (large enough to store a batch of data values). The threshold may correspond to the size of a batch of data values to be loaded.

In embodiments, the data processing system (storage management circuit) is configured to determine (monitor) the amount of space in the data source (the number of storage locations not storing data values required to be retained), and to load new data values into the data source (only) when this exceeds a threshold size (in an embodiment corresponding to the size of a batch of data values to be loaded).

The data processing system (storage management circuit) is in an embodiment configured to load input data value(s) into a data source from (to obtain data values(s) from) other storage of the data processing system. The other storage may comprise storage of or accessible to the data processor. For example, the other storage may comprise local, on-chip, storage, which may be for example part of the data processor (e.g. an L1 cache or buffer) or accessible to the data processor (e.g. an L2 cache or buffer). Alternatively (or additionally) the other storage may comprise main, off-chip, memory (e.g. a main memory of the data processing system), which may be accessed for example via a suitable interconnect (and cache hierarchy). For example, it may be the case that, for programs for performing neural network processing for example, input data values (e.g. comprising weight data or input feature map data) to be loaded into the data source(s) of the storage accessible to the execution unit are stored in main, off-chip memory.

It is discussed above how the control of a data source storing input data values (to be read by the execution unit when performing data processing operations) in response to 'no longer required to be retained' indications can be used to 'free up' space for loading new input data values into the data source as a background process.

Control of a data source in response to 'no longer required to be retained' indications can also (or instead) be used to facilitate outputting (e.g. writing out to memory) output data values generated by the execution unit when performing data processing operations (from a data source storing output values generated by the execution unit).

For example, in the case of a data source storing output value(s) generated by the execution unit, the data processing system (storage management circuit) may be configured to, in response to an indication in an instruction indicating that one or more data values in the data source are no longer required to be retained, output those one or more data values no longer required to be retained.

In an embodiment the one or more data values no longer required to be retained are output by writing out to storage. The storage may comprise local, on-chip, storage, which may be for example part of the data processor (e.g. an L1 cache or buffer) or accessible to the data processor (e.g. an L2 cache or buffer). Alternatively (or additionally) (and in an embodiment) the storage comprises main, off-chip, memory. For example, it may be the case that, for programs for performing neural network processing for example, output data values (e.g. comprising output feature map data) are output to main, off-chip memory.

Alternatively, the one or more data values no longer required to be retained could be output in any other suitable and desired manner, for example by streaming or otherwise broadcasting those data values.

The data value(s) could be output (e.g. written out to memory) directly in response to executing an instruction with a 'no longer required to be retained' indication, so as to immediately output those data values.

Alternatively, and in an embodiment, executing an instruction having a 'no longer required to be retained' indication, in respect of one or more output data values stored in a data source, causes the data processing system (storage management circuit) to remove those data value(s) from the set of data values required to be retained (perform a 'shift' of the head pointer), with the data values then being output (e.g. written out to memory) as a background process (without reference to execution of instructions, and 'no longer required to be retained' indications).

Data values may be (and in an embodiment are) output from the data source in batches, so that multiple data values are output at a time from a data source. This can provide bandwidth and processing capacity saving compared to outputting output data values individually. (Similarly to loading input data values in batches), the batch size may be based on the size of a memory "transaction", and may be the same or different between data sources.

In the case where data values are output directly in response to executing instructions containing 'no longer required to be retained' indications, outputting in batches could be achieved, for example, by providing a 'no longer required to be retained' indication in an appropriate instruction in the sequence of instructions for the program to be executed (for example, as part of a compiling process) by which instruction a predetermined number of data values (corresponding to a 'batch' size) will be written to the data source (since a previous 'no longer required to be retained' indication for that data source).

Alternatively, in the case where output data values are indicated as being 'no longer required to be retained' are output (e.g. written out to memory) as a background process, then the background process may operate to output (e.g. write to memory) data values in batches (for example, once a sufficient number of data values corresponding to a 'batch size' are 'no longer required to be retained' in the data source (are shifted out of the queue for the data source)). In this case, the background process may track which of the data values 'no longer required to be retained' have been output (e.g. written to memory).

One or more (or all) of the data sources controlled in response to 'no longer required to be retained' indications may be adaptively sized. This may help to hide any latency associated with loading data values into and/or outputting data values from the data source. For example, for example a region of storage (set of data storage locations) assigned for the data source may be adjustable (to increase in size or decrease in size), in an embodiment during execution of a program. The size (storage capacity) may be adjusted based on any of: memory access latency; rate of use input data values during processing for a program (data values consumption rate); and rate of generation of output data values during processing for a program. In this way, data sources may be adapted so that sufficient space is provided for loading new input data values from memory in advance of being needed and/or for writing data values generated during program execution.

In an embodiment one or more (in an embodiment all) of the data sources which are controlled in response to 'no longer required to be retained' indications in instructions have associated metadata which indicates how data should be loaded from storage (e.g. main memory) and/or indicating how data values should be written out to storage (e.g. main memory) (for data sources which are to store output data values generated by the execution unit when performing data processing operations). In an embodiment the metadata (the memory fetch metadata, comprising memory access information) indicates a storage (memory) access pattern for the storage (memory) addresses (locations) from which data is to be loaded from storage (memory) or to which data is to be written out to.

The data processing system is configured to load data into data source(s) based on the metadata for the data source(s) (with data values in an embodiment being loaded in batches, as discussed above, in accordance with the storage (memory) access pattern indicated by the metadata), and/or to write out data values from data source(s) based on the metadata for the data source(s) (with data values in an embodiment being written out in batches, as discussed above, in accordance with the storage (memory) access pattern indicated by the metadata).

The metadata (storage (memory) access information) could be stored in any suitable and desired way. For example, the metadata could form part of a (memory) fetch logic of the (each) data source concerned (for example part of the memory fetch logic of the tile buffer when the tile buffer is used for one or more of the data sources) (as part of the storage management circuit), and may be programmed by the execution unit. Alternatively, the metadata may be stored in a data structure in (main) memory and fetched (by the storage management circuit) when required for use when loading data into the data sources.

The metadata (storage (memory) access pattern) is permitted to (and in an embodiment does) differ for different data sources. This can allow (and in an embodiment causes) different data sources to be access parts of the storage (memory) (according to different storage (memory) access patterns). For data sources into which input data values are to be loaded form main memory, this can accordingly allow each data source to load its desired data, which may differ from the desired data for another data source.

For example, in embodiments where the program is for performing machine learning (for example neural network processing), one or more data sources may be loaded with (used to store) input data values corresponding to an input feature map and/or weight array data (for example to be processed in a layer of neural network processing, for example such as a convolution layer). In embodiments, different data sources are used to store different parts of the input feature map and/or weight array to be processed (such that the input feature map and/or weight array data are divided among plural of the data sources).

In a particular embodiment, plural data sources are respectively loaded with (used to store) different lines (rows) of an input feature map (or weight array), in an embodiment with consecutive lines of the input feature map (or weight array) alternating between the data sources. In an embodiment a first data source is loaded with even lines of the input feature map (or weight array), and a second data source is loaded with odd lines of the input feature map (or weight array). As will be shown in more detail in the examples which follow, the Applicant has recognised that assigning alternating rows of an input feature map (or weight array) to alternating data sources can work effectively, for example to increase processing efficiency and throughput, when storage is controlled in response to 'no longer required to be retained' indications as disclosed herein as the weight data is progressively applied to (multiply-accumulated with) different regions of the input feature map in turn.

Alternatively, an input feature map and/or weight data array could be divided among the data sources in any other suitable and desired way. For example, consecutive columns of the input feature map (or weight array) could alternate between plural of the data sources.

As another example, multiple columns or rows of the input feature map (or weight data array) could be loaded into each of one or more respective data sources. For example, a first data source could be loaded with data for a first block (plurality of lines, e.g. 540 lines) of an input feature map (or weight data array) from storage (memory) and a second data source could be loaded with data for a second (next) block (plurality of lines, e.g. the next 540 lines) of the input feature map (or weight data array).

Analogously, different parts of an output data array (output feature map) generated when the execution unit performs data processing operations according to program instructions could be written to multiple different data sources. Each data source storing output data values may have is own (different) respective memory access patterns, to allow the part of the output data array stored in the data source to be written out to an appropriate part of the memory.

The metadata indicating how data should be loaded from (or written to) storage into the data source(s) may be any suitable and desired metadata which identifies the data value(s) to be loaded (the storage (memory) locations from which data value(s) are to be loaded, or the storage (memory) locations to which data value(s) are to be written out).

For example, the metadata may provide information about (indicate) the region (part) of storage (memory) from which data is to be loaded (or to which data is to be written out). This could be done by indicating in the metadata a start address and end address in storage (memory), with the data stored at all (contiguous) memory locations between the start and end address then being loaded into the data source (or with all (contiguous) memory locations between the start and end address then being written out to).

However, the Applicant has recognised that the desired data to be loaded into a data source may not be stored in contiguous storage (memory) locations (and likewise the desired memory locations to be written out to may not be contiguous). For example, for storage (memory) storing lines of data, only part of a (each) line of data and/or only certain lines of data may be required (used). This may be particularly the case where different lines of an input feature map (or weight array) are stored (or different lines of an output feature map array is to be stored) in different (e.g. respective) lines of storage (memory), or where an input feature map (or weight array) (or output feature map) are divided among different data sources (as discussed above).

Thus, in embodiments the metadata indicates, for storage (memory) storing lines of data, which part of a (each) line of data is required (to be used) and/or which lines of data are required (to be used).

In embodiments, the metadata for a (each) data source controlled in response to 'no longer required to be retained' indications comprises one or more (or all) of: a storage (memory) location (a storage (memory) address) (for example a start address) from which data is to be obtained (or to which data values are to be written); an amount of (length of) data to be loaded (or to which data values are to be written) from each line in storage (memory); a number of lines in storage (memory) from which data is to be read (or to which data values are to be written); and a spacing (offset) between the lines in storage (memory) from which data is to be read from (or to which data values are to be written).

Alternatively or additionally, it may be the case that within a line of data stored in storage (memory) there are values which are not required to be loaded (or are not to store output data values from a data source) and so can be skipped (so that data is loaded from (or written to) storage (memory) locations which are not contiguous along the line of storage (memory), for example with data values being loaded from (or written to) storage (memory) locations having a particular, for example predetermined, stride). Which storage (memory) locations are be skipped (the stride between data values in memory) may depend, for example, on a stride with which a weight data array (to be loaded from memory) is applied to an input feature map (to be loaded from memory). Accordingly, the metadata may additionally (or alternatively) account for (indicate) a stride (spacing between) data values required to be loaded (a stride between storage (memory) locations from which data value are to be loaded) (or a stride between storage locations to which data values are to be written).

The metadata could be (and in embodiments is) at least partly shared for different data sources, for example when different data sources have similarities in their storage (memory) access patterns. For example, one or more different data sources could share one or more of the indication of: the storage (memory) location (storage (memory) address) (for example a start address) from which data is to be obtained (or which to which data is be written); the amount of (length of) data to be loaded from (or written to) each line in storage (memory); the number of lines in storage (memory) from which data is to be read (or to which data is to be written); the spacing (offset) between the lines in storage (memory) from which data is to be read (or to which data is be written); and the stride between data required (or written) along a (each) line of storage (memory).

As discussed above, the execution unit of the data processor executes instructions for execution threads executing the program. The execution threads may be grouped (into thread groups, otherwise known as 'warps') (when the data processor is a single instruction multiple thread (SIMT) processor). In embodiments, each thread in a thread group (warp) is assigned one or more respective data source (has one or more corresponding, dedicated, data sources) from which it is to read input data values when performing data processing operations (which may be a data source of the type controlled in response to 'no longer required to be retained' indications). Each thread in the thread group may process a different portion of an input feature map (or weight data array) (and generate a different portion of an output feature map), and so its associated data source(s) may have appropriate metadata (memory access data) for loading the portion of the input feature map (or weight data array) from memory (and for writing the portion of the output feature map to memory) (as discussed above).

For example, a first execution thread could be used for processing a first block (plurality of lines, e.g. 540 lines) of an input feature map (or weight data array) and a second execution thread in the same group be used for processing a second (next) block (plurality of lines, e.g. the next 540 lines) of the input feature map (or weight data array), and so on.

If one or more input data values required to be read for executing an instruction (by a thread) are not available in the data source indicated by the instruction (the data source assigned to that thread), for example if those input data values have not yet been loaded into the data source, then in an embodiment the thread is stalled, and in an embodiment re-started once the data is available (once the data has been loaded into the data source). In this regard, when the execution unit executes an instruction requiring data value(s) to be read from data source(s), before attempting to read the data value(s) from the indicated storage location(s) in those data source(s), it may first be checked (for example by the storage management circuit) whether the indicated storage location(s) do indeed store valid data, with execution of the instruction stalling until valid data is available.

If thread in a thread group diverge during execution (so that they begin to execute different instructions to one another, for example with the execution of one thread running ahead of another thread), they may be permitted to access (e.g. read from) data sources of the type controlled in response to 'no longer required to be retained' indications, but in an embodiment are not permitted to trigger 'shift' operations for the data sources. Thus when a shift indication is encountered in the sequence of instructions, it may act as a barrier, with all threads of the group required to progress past the barrier (trigger the 'shift' operation for their respective data sources) at the same time.

Alternatively, (rather than being part of a SIMT data processor), the execution unit could be part of a single instruction single data (SISD) data processor (a scalar register). Alternatively, the execution unit could be part of a SIMD (single instruction multiple data) data processor, in which case multiple lanes/channels could be processed at a time, for example processing different channels of an input feature map, or processing different regions of an input feature map and/or weight data array).

In embodiments, the instructions in the program to be executed are prepared by a compiler for the data processor. In an embodiment, the compiler is executed on a host processor (e.g. a CPU) of the data processing system. In embodiments, the compiler comprises a compiler circuit, comprising a programmable processing circuit that is appropriately programmed to perform the required compiler operation.

The technology described herein also extends to compiler operation for generating instructions in a program to be executed in the manner of the technology described herein per se.

Hence, in an embodiment the technology described herein comprises a method of compiling a program to generate instructions for a data processor in which execution threads may execute program instructions to perform data processing operations, the data processor comprising:

an execution unit operable to execute instructions in a program to be executed to perform data processing operations for execution threads executing the program; and storage operable to store input data values for use by the execution unit when executing an instruction to perform a data processing operation for an execution thread and to store output data values generated by the execution unit when performing a data processing operation for an instruction being executed by an execution thread;

the method comprising:

including in one or more instructions in the program to be executed an indication of one or more data sources for use by the execution unit when performing a data processing operation, and also including an indication that one or more data values in a data source of the one or more indicated data sources are no longer required to be retained in said data source.

In an embodiment, the technology described herein comprises a compiler that compiles programs to generate instructions for a data processor in which execution threads may execute program instructions to perform data processing operations, the data processor comprising:

an execution unit operable to execute instructions in a program to be executed to perform data processing operations for execution threads executing the program; and storage operable to store input data values for use by the execution unit when executing an instruction to perform a data processing operation for an execution thread and to store output data values generated by the execution unit when performing a data processing operation for an instruction being executed by an execution thread;

the compiler comprising a processing circuit configured to:

for a program comprising a set of instructions to be executed by the execution unit of the data processor, include in one or more instructions an indication of one or more data sources of the storage for use by the execution unit of the data processor when performing a data processing operation, and also include an indication that one or more data values in a data source of the one or more indicated data sources are no longer required to be retained in said data source.

As will be appreciated by those skilled in the art, the compiler may be configured to compile a program consistent with (and the compilation process for compiling the program may be consistent with), and in combination with, any of the features of the technology described herein described herein, as appropriate.

Accordingly, in an embodiment, the compiler (the compilation process) for a program to be executed is operable to, and is configured to, set for instructions in the program the indications of which data source(s) input data value(s) are to be read from and/or to which output data values are to be written to, and the indications of whether the data source(s) contain input data values which are no longer required to be retained (the 'no longer required to be retained' indications).

A 'no longer required to be retained' indication may be included (by the compiler) when any appropriate instruction in the sequence of instructions is reached, for example being includes in a last instruction requiring a particular input data value from a data source (when the compiler determines that an instruction is the last instruction using a particular input data value) or an instruction generating a particular output data value.

For example, in embodiments processing to be performed for a program may comprise applying a weight data array to different regions of an input data array in turn, for which the input data array may be stored in one or more data sources (of the type) controlled in response to 'no longer required to be retained' indications. In this case, a 'no longer required to be retained' indication may be included in an instruction which is the last instruction reading a particular input data value (as the weight data array is moved to different regions of the input feature map).

The compiler (compilation process) may also be configured to include in instructions any of the other indications disclosed herein, such as for example any of, an indication of which data value(s) are to be read from the indicated data source(s), an indication of one or more data source(s) to which output data value(s) are to be written, an indication of the data processing operation to be performed, and an indication of whether the indicated data source(s) are to be controlled based on 'no longer required to be retained' indications.

In embodiments, the compiler (compilation process) is configured to analyse a program to be to be executed (for example a program provided as higher-level code, e.g. by an application on a host processor that requires data processing), in embodiments to determine the (appropriate) data source(s) to be used when executing the program (and to indicate those data source(s) in respective instructions), and in embodiments to (also) determine when data values will fall out of use in those data source(s) as the program is executed (and to provide appropriate 'no longer required to be retained' indications in instructions in order to retire from use those data values from data sources, provided the data source is of a type which is to be controlled based on 'no longer required to be retained' indications). The analysis and setting of the indications may be (and in embodiments is) based on, and in accordance with, any one or more or all of the conditions and criteria discussed above.

In embodiments, and in an embodiment, the compiler execution is be performed in advance of the instructions being required for execution of the program, in an "offline" manner. Thus, the compilation process is in an embodiment done in advance of runtime, rather than at runtime for executing the program. In such embodiments, the compiler operation will accordingly, and in an embodiment, prepare in advance the sequence of instructions for the program to be executed which can then, e.g., be stored for future use. In this regard, the Applicant has recognised that programs such as for example, programs for performing machine learning (neural network processing) may use input data values (and have input data values fall out of use) and generate output data values in a predictable order, and so the compiler can determine in advance which data sources to use for input data values and/or output data values and when (in which instructions in the sequence of instructions for the program) to include 'no longer required to be retained' indications.

As is apparent from the above discussion, provision of 'no longer required to be retained' indications in instructions (and the control of storage of data values in data sources in response to 'no longer required to be retained' indications) in accordance with the technology described herein can be used to trigger removal of data values which are no longer required to be retained from those data sources, thereby freeing up space for new input data values to be loaded in advance of being needed and/or allowing output data values to be output to other storage, e.g., and in an embodiment as a "background" process.

Accordingly, it may be the case that separate load-type and/or store-type instructions are needed less often, or indeed can be (and in embodiments are) not provided (at all) for data sources which are controlled in response to 'no longer required to be retained' indications.

Accordingly, in embodiments, the instructions in a program to be executed (as compiled by the compiler) do not contain any load instructions and/or store instructions for data sources which are to be controlled (are of a type controlled) in response to 'no longer required to be retained' indications.

In embodiments in which a program to be executed comprises neural network processing comprising applying a weight data array to an input data array (input feature map), the instructions for applying the weight data array to the input data array are in an embodiment free from load instructions and/or store instructions for data sources which are to be controlled (are of a type controlled) in response to 'no longer required to be retained' indications, in an embodiment comprising a sequence of plural multiply-accumulate instructions (only).

In an embodiment, instruction(s) which include a 'no longer required to be retained indication' for a data source are not load instructions and/or are not store instructions (in other words, the data processing operation indicated in the instruction is in an embodiment not a load operation). The data processing operation may be, and in an embodiment is in the case of a program for performing neural network processing, a multiply-accumulate instruction.

As will be apparent from the above discussion, in accordance with the technology described herein, data sources in the storage accessible to the execution unit may be controlled in different ways. For example, one or more data sources may be controlled (be of the type controlled) in response to 'no longer required to be retained' indications. Whereas, one or more (other) data sources may not be controlled (may not be of the type controlled) in response to 'no longer required to be retained' indications (and may be, for example, 'normal' registers).

Thus, in a more general aspect, the technology described herein also relates a data processing system in which data sources of the storage can be controlled in different ways (according to different control procedures (mechanisms)).

Hence, in an embodiment the technology described herein comprises a method of operating a data processing system, the data processing system comprising:
  a data processor, the data processor comprising:
    an execution unit operable to execute instructions in a program to be executed to perform data processing operations for execution threads executing the program; and
    storage operable to store input data values for use by the execution unit when executing an instruction to perform a data processing operation for an execution thread, and to store output data values generated by the execution unit when performing a data processing operation for an instruction being executed by an execution thread;
    wherein the data processing system is configured to control storage of data values in the storage according to plural different control procedures;
  the method comprising:
    the data processing system, in response to the execution unit of the data processor executing an instruction indicating a data source of the storage for use when performing a data processing operation, and indicating which of the plural different control procedures is to be used for controlling storage of data values in the data source:
    controlling storage of data values in the data source based on the indication of which of the plural different control procedures is to be used for controlling storage of data values.

In other words, it can be indicated in an instruction requiring use of a data source what 'type' of control is to be used for that data source (and, e.g., correspondingly what 'type' the data source is). Providing such an indication in the instruction itself can facilitate the data processing system controlling the data source appropriately when the instruction is executed. For example, the data source can then load data values into and/or remove data values the data source according to its indicated control procedure (type) (and the execution unit can, e.g., read data values from and/or write data values to the data source according to its indicated control procedure (type). This may provide flexible of use of data sources (for example allowing data sources to be controlled in different ways) depending on the instructions being executed (and correspondingly depending on the processing desired to be performed for a program).

The control procedure for the data source is, in embodiments, any of the control procedures (mechanisms) disclosed herein. The control procedure may comprise a control procedure for loading data into and/or removing output data from the data source.

For example, the control procedure indicated may comprise control in response to 'no longer required to be retained indications' (for example having any of the features described herein) (and accordingly the indication in the instruction of the relevant control procedure may comprise an indication that the data source is of a type controlled in response to 'no longer required to be retained' indications).

Conversely, the instruction may indicate that the control procedure does not use (is not responsive to) 'no longer required to be retained indications' (and accordingly the indication in the instruction of the relevant control procedure may comprise an indication that the data source is not of a type controlled in response to 'no longer required to be retained' indications). In this case, the control procedure (type) may be 'normal' control, for example in response to load-type and/or store-type instructions, or any other suitable and desired 'normal' control for loading input data into and/or removing output data from the data source, such as for example broadcasting, streaming or other 'normal' mechanisms.

Correspondingly, in an embodiment the technology described herein comprises a data processing system, the data processing system comprising:

a data processor, the data processor comprising:

an execution unit operable to execute instructions in a program to be executed to perform data processing operations for execution threads executing the program; and storage operable to store data values for use by the execution unit when executing an instruction to perform a data processing operation for an execution thread and to store output data values generated by the execution unit when performing a data processing operation for an instruction being executed by an execution thread;

wherein the data processing system is configured to control storage of data values in the storage according to plural different control procedures;

the data processing system further comprising a processing circuit configured to:

in response to the execution unit of the data processor executing an instruction indicating a data source of the storage for use when performing a data processing operation, and indicating which of the plural different control procedures is to be used for controlling storage of data values in the data source:

control storage of data values in the data source based on the indication of which of the plural different control procedures is to be used for controlling storage of data values.

In an embodiment the technology described comprises a method of compiling a program to generate instructions for a data processor in which execution threads may execute program instructions to perform data processing operations, the data processor comprising:

an execution unit operable to execute instructions in a program to be executed to perform data processing operations for execution threads executing the program; and storage operable to store input data values for use by the execution unit when executing an instruction to perform a data processing operation for an execution thread, and to store output data values generated by the execution unit when performing a data processing operation for an instruction being executed by an execution thread;

wherein the data processing system is configured to control storage of data values in the storage according to plural different control procedures;

the method comprising:

including in one or more instructions in the program to be executed an indication of one or more data sources of the storage for use by the execution unit when performing a data processing operation, and also indicating which of the plural different control procedures is to be used for controlling storage of data values in the data source.

In an embodiment, the technology described comprises a compiler that compiles programs to generate instructions for a data processor in which execution threads may execute program instructions to perform data processing operations, the data processor comprising:

an execution unit operable to execute instructions in a program to be executed to perform data processing operations for execution threads executing the program; and storage operable to store input data values for use by the execution unit when executing an instruction to perform a data processing operation for an execution thread, and to store output data values generated by the execution unit when performing a data processing operation for an instruction being executed by an execution thread;

wherein the data processing system is configured to control storage of data values in the storage according to plural different control procedures;

the compiler comprising a processing circuit configured to:

for a program comprising a set of instructions to be executed by the execution unit of the data processor, include in one or more instructions in the program to be executed an indication of one or more data sources of the storage for use by the execution unit when performing a data processing operation, and also indicate which of the plural different control procedures is to be used for controlling storage of data values in the data source.

As discussed above, the program to be executed in embodiments of the technology described herein may be (and in an embodiment is) a machine learning program, in an embodiment performing neural network processing.

The machine learning program may perform any suitable and desired machine learning operation, for example, computer vision, natural language processing, or other machine learning or artificial intelligence processes.

The machine learning program may process any suitable and desired input to generate a useful output. The input may be, for example one or more of image data (one or more images), video data (a series of one or more images), sound data, digital signal data, sensor data, or other suitable and desired input data. The useful output may comprise a result derived from the input data, for example an "inferencing" or "classification" result (e.g. identifying one or more features, e.g. objects, from image or video or sensor data, or identifying one or more spoken words in sound data, creating an enhanced image (e.g. super resolution) or any other useful output inferred from the input data). As another example, the useful output may comprise a de-noised or otherwise refined output based on the input.

For machine learning comprising neural network processing, the neural network processing may comprise a sequence of operations (which may be referred to as "layers" of neural network processing), which each process an input data array (tensor) to provide an output data array (tensor), which may become the input data array (tensor) for another operation (layer). The sequence of operations (layers) for the overall neural network, may take an overall input (overall input data array (tensor)), and process at least part of that overall input through the sequence of neural network processing operations (layers) to provide an overall output (overall output data array (tensor) of the neural network.

Accordingly, the input/output data arrays for a (each) layer of neural network processing may be derived from (representative of) part of, or the entirety of, the overall input (e.g. image or sound data) initially provided to the neural network.

The input data array (tensor) for a (each) layer of neural network processing may be referred to herein, for conciseness, as an "input feature map", and the output data array (tensor) generated by a (each) layer of neural network processing referred to as "output feature maps". The term "input feature map" and "output feature map" are not intended to limit to any particular layer of neural network processing, and are intended to encompass for example the input to and output from a convolution layer, activation layer, pooling layer, input layer, output layer, or any other layer of neural network processing.

The input/output data arrays (input/output feature maps) may comprise one-or multi-dimensional arrays of data.

The neural network processing "layers" may comprise any suitable and desired number and types of layers, such as convolution layers, activation layers, pooling layers, etc.

The operations (performed by layers of processing) which process input data array(s) to generate output data array(s) in the neural network may comprise any suitable and desired types of operations, such as convolution operations, activation operations, pooling operations, elementwise operations, resize operations, or other operations.

In embodiments, one or more operations (layers) of processing of the neural network program comprises applying a set of weight data (weight array) (also termed "a filter" or "kernel") to an input feature map (an input data array), to generate a corresponding output feature map (an output data array), in an embodiment comprising performing a weighted sum (multiply-accumulate) using input data (of the input feature map) and weight data (of the weight data array). This may be part of a convolution layer of neural network processing. The set of weight data (weight array) may be determined during training of the neural network.

The data processing operations performed in response to (and indicated in) instructions in accordance with the technology described herein may be any suitable and desired processing operations for machine learning, for example as part of a layer of neural network processing. For example, the data processing operations may comprise a multiply-accumulate operation (which causes one or more input data values from an input feature map to be multiply-accumulated with one or more weight values from a weight array).

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images or other useful outputs based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of useful output that a data processor (and processing pipeline) may be used to generate. For example, in the case of graphics processing, the graphics processing pipeline may generate frames for display, render to texture outputs, etc. In the case of neural network processing, the output may be a classification or other information inferred from the input data (e.g. image data, sound data or other input data). The output data values from the processing are in an embodiment exported to external, e.g. main, memory, for storage and use, such as to a frame buffer for a display.

The technology described herein is applicable to any suitable form or configuration of data processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the data processing system and processor can otherwise include any one or more or all of the usual functional units, etc., that data processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code configured to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

FIG. 1 shows a typical data processing system (in this example, a computer graphics processing system).

An application 2 executing on a host processor 1 may require data processing operations to be performed by an associated data processor 3.

The application 2 could be, for example, a game, an Extended Reality (xR) application (for example an application using Augmented Reality (AR), Virtual Reality (VR), Mixed reality (xR), etc.) or other application desiring computer processing to be performed.

In the example shown the data processor 3 is a GPU (graphics processor) that executes a graphics processing pipeline. In this regard, a graphics processor (GPU) may be suitable for performing processing for games, xR and other applications, which may (and in embodiments do) include machine learning processing, such as neural network processing. However, a dedicated neural network processor (NPU) or other processor or accelerator could instead be used as the data processor 3.

The application 2, when requiring data processing (computer processing) to be performed may generate API (Application Programming Interface) calls that are interpreted by a driver 4 for the data processor 3 that is running on the host processor 1 to generate appropriate commands to the data processor 3 to perform the data processing required by the application 2. To facilitate this, a set of "commands" will be provided to the data processor 3 in response to commands from the application 2 running on the host system 1 for graphics output (e.g. to generate a frame to be displayed).

Specifically, in order to achieve this, the application 2 may provide programs implemented using a high-level programming language, such as GLSL, HLSL, OpenCL, etc. These programs are then translated by a compiler 6 to binary code. This may include the creation of one or more intermediate representations of the program within the compiler.

Figure 2:
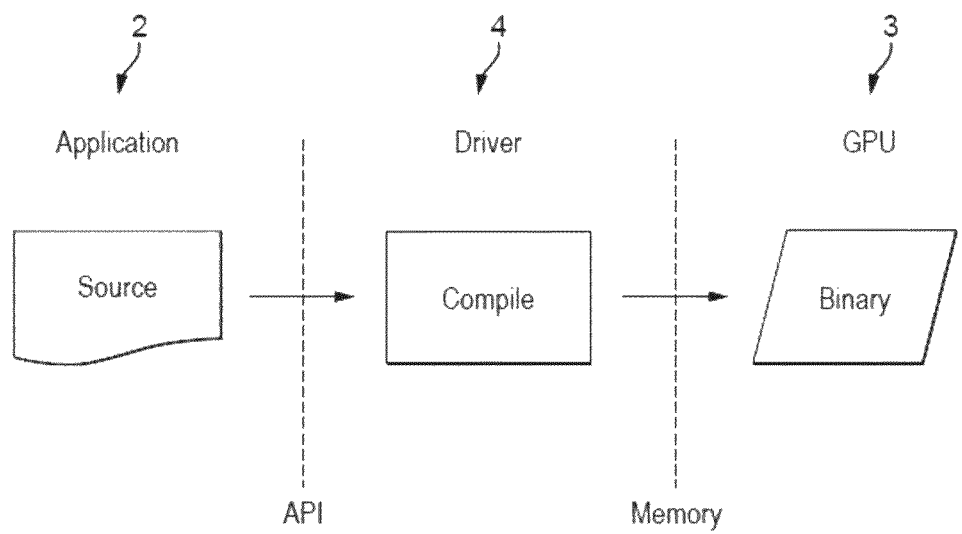
FIG. 2 is a schematic diagram illustrating an example of program compilation.

FIG. 2 illustrates this, and shows a program being provided in a high-level programming language by an application 2 to the driver 4, which then compiles the program into a sequence of instructions represented in binary code for the data processor 3.

The compiler 6 may run on the host processor 1 of the data processing system that includes the data processor. The compiler 6 may, e.g., be part of the driver 4, with there being a special API call to cause the compiler to run. The compiler execution can thus be part of the preparation done by the driver in response to API calls generated by an application. However, other arrangements would be possible, such as the compiler running on the data processor 3, or the compiler being run on a separate processor, such as the program being pre-compiled on a separate system and being distributed in a compiled form.

Figure 3:
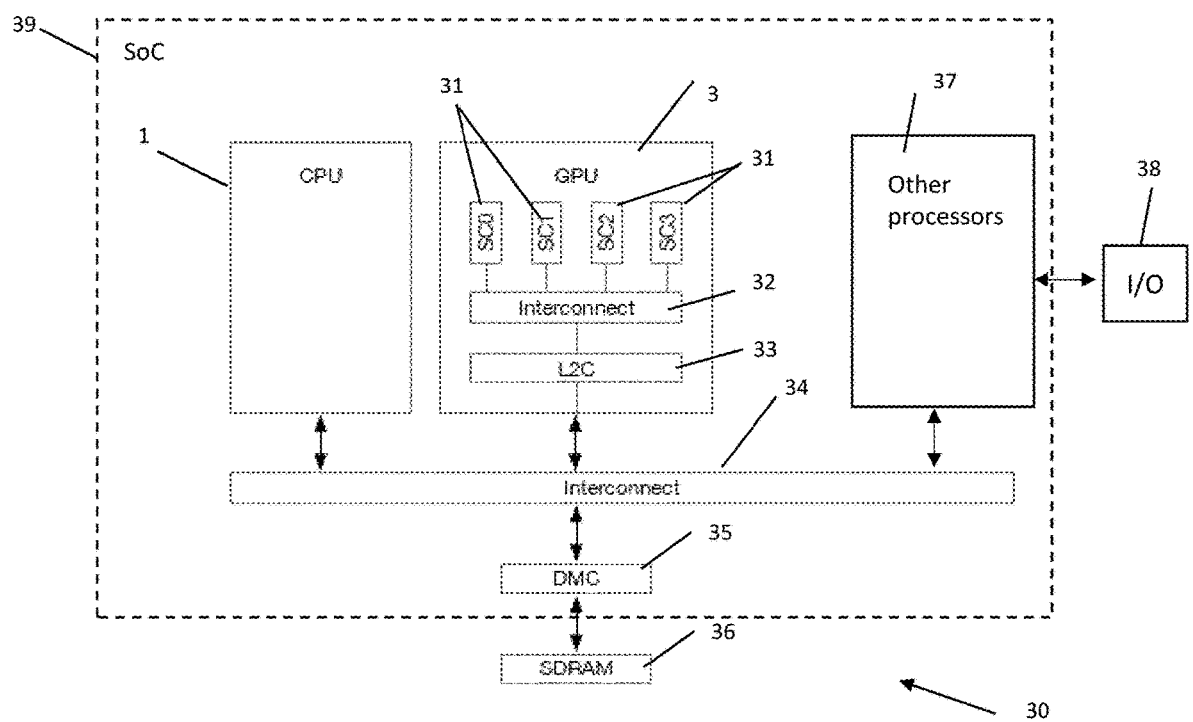
FIG. 3 is a schematic diagram illustrating a data processing system in embodiments of the technology described herein.

FIG. 3 schematically illustrates an example data processing system 30 in accordance with embodiments of the technology described herein.

The data processing system 30 comprises a host processor 1 (which is a central processing unit, CPU), and a data processor 3 (which in this case is a GPU). The data processor comprises a plurality of processing cores 31 (which in this case are shader cores SC0, SC1, SC2 and SC3 operable to perform shading operations for computer graphics processing, which may additionally be controlled to perform machine learning processing).

The data processing system 30 may comprise one or more other processors 37, for example such as one or more or all of: a display processor (display processing unit, DPU), a video processor (video processing unit, VPU), a sound processor, an image signal processor (ISP), a digital signal processor (DSP), and one or more neural network processors (neural network processing units, NPUs).

The data processing system 30 may comprise a system on chip (SoC) 39, with one or more of the host processor 1, data processor 3, and other data processors 37 being integrated within a (single), e.g. silicon, chip. Any of the processors 1, 3, 37 may be in communication with suitable and desired input/output (I/O) devices 38 of the data processing system, for example including a display for displaying outputs generated by the data processing system, and for example one or more devices through which data can be captured and provided to the data processing system (such as a touch sensitive screen, keyboard, joystick, headset, camera, sensor, etc.)

The data processor 3 may comprise storage 33 which is local to, e.g. integrated within, the data processor, such as a level two cache (L2C), which may be accessed by the processing cores 31 via an interconnect 32. The interconnect 32 may be operable to provide data values from the level two cache 33 to any of the processing cores 31 for use when executing a program, and to provide output data values from any processing core 31 to the level two cache 33.

The data processing system further comprises a main, off-chip, memory 36 (which in this example is of the type Synchronous Dynamic Random-Access Memory (SDRAM)). The data processing system may comprise an interconnect 34 and a dynamic memory controller 35 via which data is obtained (read) from and output (written) to the main memory 36.

The data processing system may comprise appropriate memory management units (MMUs) through which memory requests pass, the MMUs processing the memory requests. An MMU may be incorporated into or associated with any of the CPU 1, GPU 3 and other processors 37 shown. Alternatively or additionally there may be a MMU for the SoC, or for the data processing system as a whole. For readability these MMUs are not shown in the figures.

Figure 4:
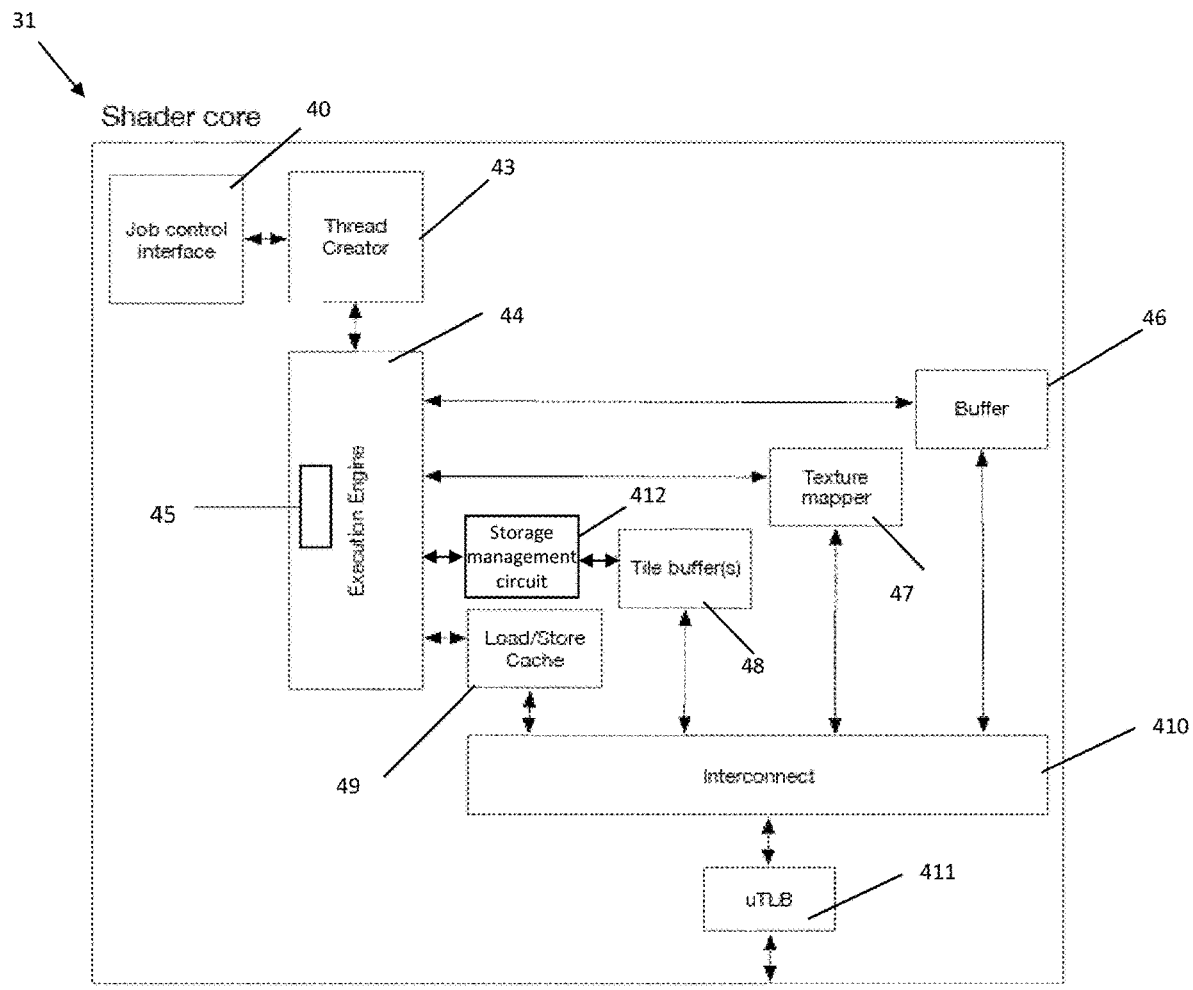
FIG. 4 is a schematic diagram illustrating an example configuration of a shader core a graphics processor of the data processing system.

FIG. 4 shows in more detail the components of a processing core 31 of the data processor 3 in example embodiments of the technology disclosed herein.

The processing core 31 comprises an execution unit 44 for executing instructions in a sequence of instructions provided to the data processor 3 for the program which is desired to be performed. The execution unit 44 may run a plurality of execution threads in order to execute the program instructions. The threads may be created for execution by a thread creator 43 of the processing core, upstream of the execution unit 44.

Upstream of the thread creator 43, the processing core may comprise a job control interface (a job control circuit) 40 which acts as an interface for the processing core 31 and receives processing "jobs" to be performed by the processing core to perform the jobs accordingly (each "job" comprising a work item to be performed by executing a set of program instructions).

The job control circuit may comprise an instruction fetch circuit for fetching instructions to be executed for the program (e.g. from main memory, where they have been stored during compiling), and an instruction decode circuit which decodes the instructions into a format which the execution unit (execution circuit) can use when executing the instructions.

The execution unit 44 may comprise any suitable and desired functional units (circuits) 45 for performing data processing operations when executing the program instructions, for example arithmetic units (circuits), bit manipulation units (circuits), logic operation units (circuits), load-type units (circuits), store type units (circuits), etc. The execution unit may comprise at least one or more multiply-accumulate units (circuits), which can be used when performing multiply-accumulate data processing operations, e.g. when executing instructions for a program requiring machine learning (e.g. neural network) processing.

The execution unit 44 may also be operable to send instructions to one or more accelerators for performing processing functions which those accelerators are adapted to perform, such as to a texture mapper 47 configured to apply a texture to an object (e.g. pixel) to be displayed in a render output, or any other suitable and desired accelerator.

The execution unit 44 has storage accessible to it, from which the execution unit can read input data values (directly) for use when performing data processing operations for instructions being executed, and to which the execution unit can (directly) write output data values generated when performing data processing operations for instructions. The storage accessible to the execution unit 44 may comprise one or more buffers 46, 48 integrated within the shader core, a data cache (Load/Store cache 49) and an instruction cache (not shown) (which may each comprise register storage). The storage accessible to the execution unit 44 may also comprise register storage within the execution unit 44 itself (not shown).

The execution unit 44 may also be able to receive data from other components of the shader core, for example receiving results of texture processing from the texture mapper 47.

The buffers 46, 48 may include a tile buffer 48 (which is configured to store, and comprises appropriate logic for storing, data values relating to tiles of a render output (e.g. image) being generated when the execution unit is performing graphics processing, or xR processing. The tile buffer 48 may comprise multiple buffers, each capable of storing a predetermined number of pixels of data (e.g. 16×16, 32×32, or 64×64 pixels (being 1 KB, 4 KB or 16 KB respectively in size)). One or more other (e.g. general purpose) buffers 46 may also be provided.

The load/store cache 49 may be used (specifically) when the execution unit requires input data values to be loaded from main memory, or output data values written to main memory. The load/store cache 49 may be operable to load data from main memory, and write data to main memory via an interconnect 410 and micro TLB (translation lookaside buffer) 411 of the processing core 31. The micro TLB 411 may operate in the usual way, e.g. performing virtual to physical address translations.

An instruction cache (not shown) may store instructions to be executed.

The texture mapper 47 (or other accelerators), buffers 46, 48, and instruction cache (not shown) may also be operable to load data from and write data to main memory using the interconnect 410 and micro TLB 411.

In embodiments of the technology described herein, instructions in the sequence of instructions for a program which are to be executed by an execution unit 44 may indicate one or more data sources (e.g. registers) of the storage (e.g. buffer 46, tile buffer 48, load/store cache 49, or registers within the execution unit, or other storage) accessible to the execution unit from which the execution unit is to read input data values and/or one or more data sources to which the execution is to write output data values, and may also indicate whether an indicated data source contains one or more data values which are no longer required to be retained (herein referred to as a 'no longer required to be retained' indication). Example instructions of this type will be described in more detail below, with respect to FIGS. 6*c* to 6*c*, and FIG. 7.

In response to the execution unit 44 executing an instruction containing a 'no longer required to be retained' indication for a data source of the storage, that data source may be controlled so as to remove/retire the data value(s) no longer required to be retained, thereby freeing up space for new data values to be stored in the data source. Control of data sources in response to 'no longer required to be retained' indications will be described in more detail below with regards to FIGS. 5a and 5b which show a data source of the type controlled in response to 'no longer required to be retained' indications.

In the case of a data source storing input data values to be read by the execution unit 44 when performing data processing operations for instructions, the 'no longer required to be retained' indications can be included in instructions to remove (e.g. invalidate) input data values as they fall out of use (for example to remove one or more data values once particular, predetermined, instruction(s) are reached in a sequence of instructions for a program being executed), thereby freeing up space for new input data values to be loaded into the data source in advance of being needed (which can help avoid stalling of the program caused by input data values being missing from a data source). The new input data values may be loaded as a background process (as will be described in more detail below with regards to FIG. 10). The new input data values can be loaded into the data source from storage (e.g., main memory 36), according to a memory access pattern for the data source (as may be specified in memory access metadata for the data source, as described in more detail below with respect to FIGS. 9a to c).

Figure 9A:
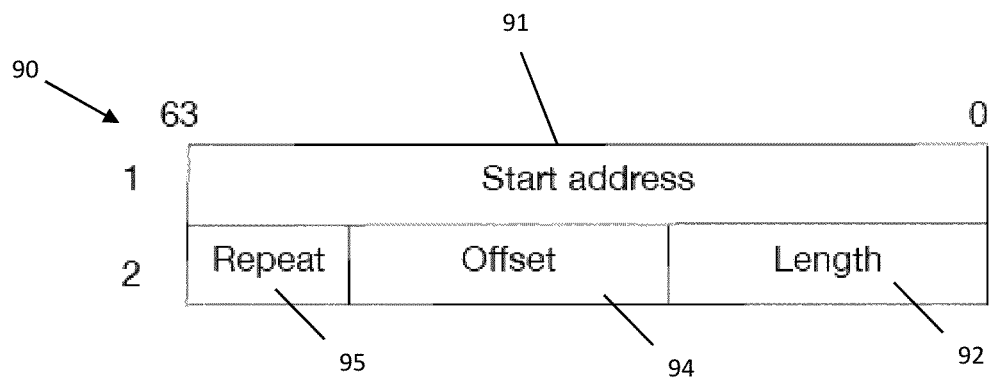
FIGS. 9a and 9b show example configurations for memory fetch metadata which can be used for loading data into a data source controlled in the manner of the technology described herein.
Figure 9B:
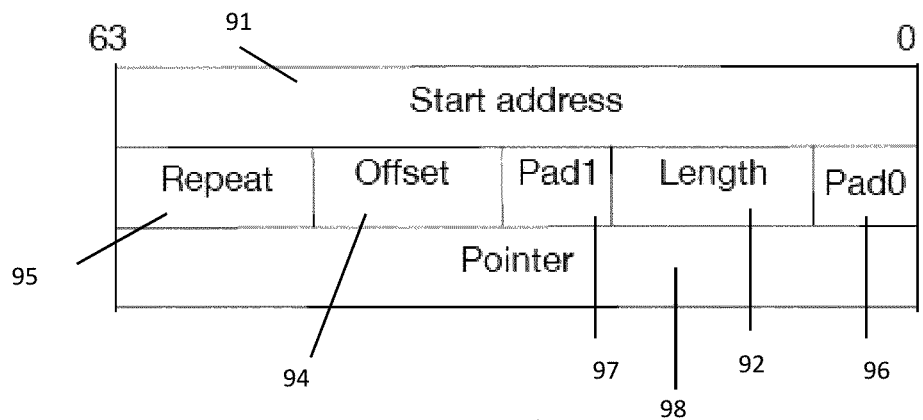
Figure 9C:
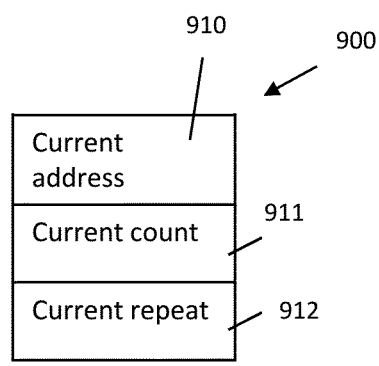
FIG. 9c shows example tracking information for loading data according to memory fetch metadata.

Alternatively or additionally, for a data source storing output data values generated by the execution unit 44 when performing data processing operations, the 'no longer required to be retained' indications can be included in instructions to cause outputting, e.g. writing out to main memory 36, of one or more data values from the data source, for example once particular, predetermined, instruction(s) are reached in the sequence of instructions for a program being executed. Output data values may be output (e.g. written to storage, e.g. main memory) directly in response to executing an instruction with a 'no longer required to be retained' indication, or (in an embodiment) separately as a background progress for outputting those data values which have been indicated in instructions as 'no longer required to be retained'. Data values may be output in 'batches'. If output to storage (e.g. main memory), the memory locations which the data values are written out to from the data source may be specified by a memory access pattern for the data source (as specified in memory access metadata for the data source, such as shown in FIGS. 9a to c). This control in response to 'no longer required to be retained' indications can 'free up' space for writing newly generated output data values to the data source (to help avoid stalling of the program due to insufficient storage space for output data values).

Control in response to 'no longer required to be retained' indications in instructions, may be particularly useful for programs where the order of use of input data values and/or the order of generation of output data values is predictable (e.g. predetermined), and for which the pattern of data accesses in main memory is predictable (e.g. predetermined), as is the case for example for processing for machine learning (as described in more detail below with respect to FIG. 12). Due to the order of use of input data values and/or order of generation of output data values being predictable (deterministic), instructions in the sequence of instructions for the program can be provided with 'no longer required to be retained' indications for data sources in advance of being executed (e.g. as part of a compiling process). An example set of instructions in this regard is discussed in more detail below. Furthermore, since the order of memory accesses when loading data values and when writing out data values is predictable (deterministic) this allows data sources to be configured with predetermined metadata for memory accesses.

Referring back to FIG. 4, in embodiments of the technology described herein a storage management circuit 412 may be provided to control the storage of data values in response to the execution unit executing instructions containing such 'no longer required to be retained' indications.

The storage management circuit 412 may be part of a (or each) processing core, for example interfacing between the execution unit 44 and storage controlled in response to the 'no longer required to be retained' indications (e.g. between the execution unit 44 and the tile buffer(s) 48, as shown in FIG. 4). Alternatively, the storage management circuit 412 could be integrated into (or divided among) any other suitable and desired component(s) of the data processing system, for example as part of the execution unit 44 itself, as control circuitry (a control circuit) for the part of the storage controlled in response to 'no longer required to be retained' indications (e.g. such as the tile buffer 48), or part of another component.

As will be discussed in more detail below, the execution of instructions by the execution unit 44 containing a 'no longer required to be retained indication' will trigger the storage management circuit 412 to control the removal of those data values no longer required to be retained from a set of data values 'required to be retained' in the corresponding data source (for example, by performing a 'shift' operation to move the head of a queue of data values in the data source).

For a data source storing input data values for use when performing data processing operations, the storage management circuit 412 may also control the loading (e.g. from main memory 36) of input data values into the data source (into data locations not storing data values required to be retained) as a background process, e.g. using a suitable algorithm (for example in accordance with memory access metadata for the data source).

For a data source storing output data values generated when performing data processing operations, the storage management circuit 412 may also control the outputting of data values which are 'no longer required to be retained' from the data source (e.g. by writing to main memory 36). This may be performed directly in response executing instructions containing 'no longer required' indications, or could be done as a background process, e.g. using a suitable algorithm.

In embodiments only part of the storage 46, 48, 49 accessible to the execution unit is controlled (is of a type which is controlled) (by the storage management circuit 412) in response to 'no longer required to be retained' indications in instructions (whereas the remaining parts of the storage are operated in their normal way, without any reference to 'no longer required to be retained' indications, for example with data being loaded into those parts from memory in response (only) to load type instructions, and data written out from those parts (only) in response to write type instructions).

In embodiments, the part of the storage which is controlled in response to 'no longer required to be retained' indications (by the storage management circuit 412) comprises one or more registers (which are part of register storage, e.g. buffers, integrated within the data processor/ processing core). In an embodiment, at least part of a pre-existing tile buffer 48 is controlled in response to 'no longer required to be retained' indications (as shown in FIG. 4). Alternatively or additionally one or more dedicated (new) buffers may be controlled by the storage management circuit 412 in response to 'no longer required to be retained' indications.

Figure 5A:
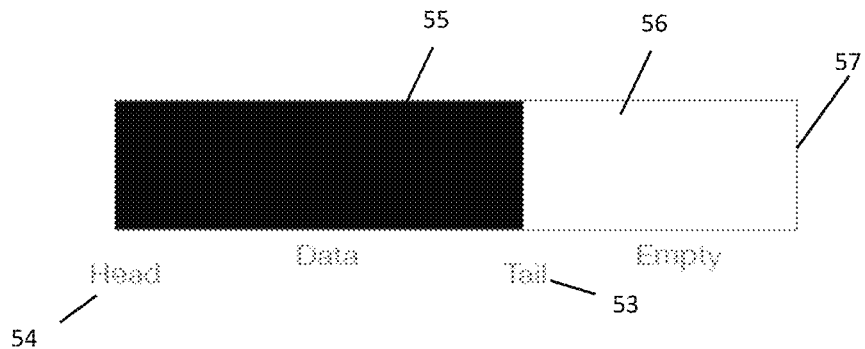
FIGS. 5a and 5b are schematic diagrams illustrating an example configuration of a data source in storage accessible to the execution unit, which can be controlled responsive to indications in instructions that data values are no longer required to be retained in the manner of the technology described herein.
Figure 5B:
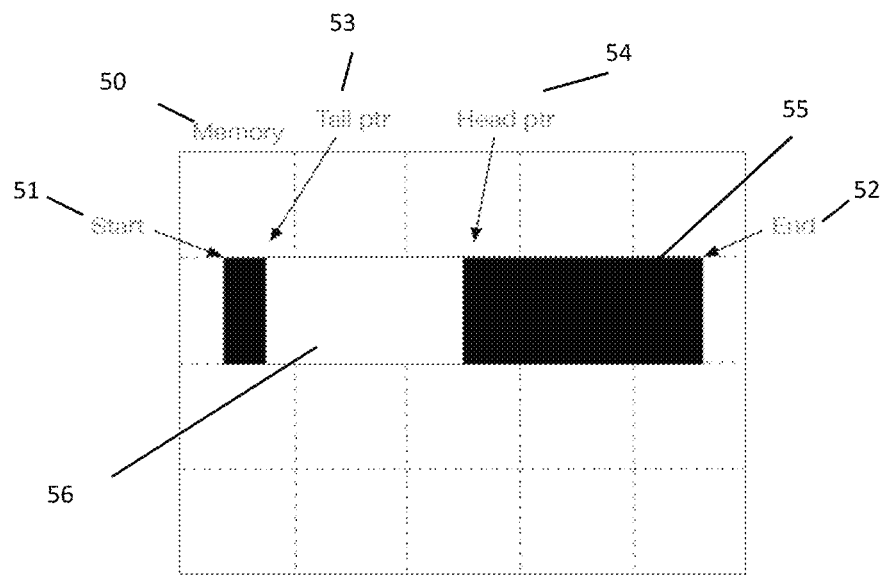

FIGS. 5a and 5b illustrate a data source (register) 50 which is controlled in response to 'no longer required to be retained' indications in instructions.

The data source 50 can be used to store input data values to be read by the execution unit when performing data processing operations for instructions, or store output data values generated by the execution unit when performing data processing operations for instructions (or store both input and output data values).

The data source 50 comprises an assigned region of storage 57 in which data values can be stored, between a start storage location (start address) 51 and an end storage location (end address) 52. The data source is controlled to have a set of storage locations storing zero or more data values which are required to be retained 55 (shown by shading).

When the data source is used for storing input data values (e.g. input feature map data, or weight data in the case of a program for machine learning), the execution unit when performing data processing operations for instructions is permitted to read any input data value from storage locations 55.

In this case, the set of data values which are required to be retained 55 comprises (in an embodiment consists of) valid input data values. The data processing system may prohibit writing to (overwriting) (e.g. loading new input data values into) input data values falling in the set of data values which are required to be retained 55. Accordingly the storage may store a set of data values 55 which are input data values accessible for reading by the execution unit (but which input data values are in an embodiment not permitted to be overwritten).

When the data source is used for storing output data values generated by the execution unit when performing data processing operations for instructions (e.g. output feature map data, in the case of a program for machine learning), storage locations 55 can be used for storing output data values which are not yet ready to be output (written out) from the data source. In other words, the data processing system (storage management circuit 412) may be prohibited from outputting (e.g. writing out to memory) data values from storage locations 55.

The set of storage locations storing data values required to be retained 55 is a set of contiguous storage locations in the data source 50. The set of storage locations storing data values required to be retained are defined between a head pointer 54 and a tail pointer 53. Thus, the data processing system (e.g. storage management circuit 412) maintains for the data source a head pointer and a tail pointer to storage locations (storage addresses) between which the data values stored are required to be retained.

In embodiments, when one or more data values in a data source 50 are no longer required to be retained (as indicated by a 'no longer required to be retained' indication in an instruction being executed), then the head pointer 54 is moved (shifted) (by the storage management circuit 412) so as to exclude the storage locations storing those data values from the set of storage locations storing data values which are required to be retained 55. The action of moving the head pointer may be referred to herein as a 'shift' operation.

Due to this control by 'shifting' the storage locations storing data values required to be retained, data sources controlled in this way may be referred to herein as a 'shifting' (or 'shiftable') register.

Any new data value(s) written to the data source (for example input data values loaded from main memory 36 as a background process, or output data values generated when executing instructions by the execution unit), are in an embodiment stored at (written to) the next storage location (s) after the tail pointer 53 (and the tail pointer is then updated (shifted) accordingly (by the storage management circuit 412) so as to encompass those storage locations within the set of storage locations storing data values required to be retained 55).

In other words, the set of data values which are required to be retained 55 in an embodiment form a first-in-first-out (FIFO) queue, with new data values being added to a tail 53 of the queue, and old data values being removed from a head 54 of the queue.

When the data source 50 is used for storing input data values, such a FIFO queue may be particularly useful when performing processing for programs in which the order in that new input data values are required for data processing operations for instructions, and the order in which input data values fall out of use, are correlated (as may be the case for programs performing neural network processing where a weight data array is applied to an input feature map according to a predetermined pattern).

In embodiments where the data source 50 is used for storing output data values generated when executing instructions, the execution unit may also be permitted to write output data values to a storage location at (or even before) the tail 53, so as to overwrite a data value in the set of data values required to be retained 55. This may be done when overwriting a partial result, for example when performing the accumulating part of a multiply-accumulate data processing operation, as shown for example with regards to the instruction sequence described below).

The data source 50 is maintained (by the storage management circuit 412) as circular storage, so that when the head pointer 54 or tail pointer 53 are moved beyond the end storage location 52 they will continue from the start storage location 51 (and likewise when moved beyond the start storage location 51 will continue from the end storage location 52). It may therefore arise, as illustrated in FIG. 5b, that the storage locations 55 storing data values required to be retained bridge the start 51 and end 52 storage locations. Maintaining the data source as circular storage allows continual, uninterrupted, shifting of the tail pointer as data is added to data source, and the head pointer as data falls is no longer required to be retained.

The set of data values which are required to be retained 55 may not occupy the entire region of storage 57 set aside for the data source, and so the data source may also comprise a set of storage locations 56 which do not store data values which are required to be retained.

For a data source 50 storing input data values to be used when executing instructions, the data source may be controlled (by the storage management circuit 412, and/or by the instructions themselves) so that any input data values stored in storage locations 56 are not accessible for reading by the execution unit, and as such those data values are treated as being invalid (are invalidated). Any input data values stored in storage locations 56 (since they are not required to be retained) are permitted to be overwritten (written to) (e.g. when loading new input data values into the data source).

For a data source 50 storing output data values generated when executing instructions, the data source may be controlled (by the storage management circuit 412) so that any output data values stored in storage locations 56 are permitted to be output (e.g. written to main memory 36).

Accordingly, as the head pointer 54 is shifted in response to 'no longer required to be retained' indications in instructions, storage locations are removed from the set of storage locations storing data required to be retained 55 and become part of the set of storage locations 56 not storing data which is required to be retained. In the case of a data source storing input data values, this has the effect of 'freeing up' those storage locations to be written to when loading new input data values into the data source (e.g. as a background process). In the case of a data source storing output data values generated when executing instructions, this has the effect of allowing data values from those storage locations to (then) be output (e.g. to main memory, e.g. as a background process), 'freeing up' space for newly generated output data values to be written to the storage.

The data source 50 may be adaptively sized, for example with the region of memory 57 assigned for the data source being adjustable (to increase in size or decrease in size), in an embodiment during execution of a program. The size (storage capacity) may be adjusted based on any of: memory access latency; rate of use input data values during processing for a program (data values consumption rate); rate of generation of output data values during processing for a program. In this way, the data source may be adapted so that sufficient space is provided for loading input data values from memory and/or for writing data values generated during program execution.

Although FIGS. 5*a* and 5*b* show a single data source (register) controlled in response to 'no longer required to be retained' indications in instructions, plural data sources (registers) of the data processing system could be managed in this same way if desired.

For example, one or more data sources 50 could be used for storing input data values to be read by the execution unit (e.g. with different data sources being used for input feature map data and/or weight data). One or more (different) data sources 50 could also or instead be used for storing output data values generated by the execution unit (e.g. comprising output feature map data).

Figure 6A:
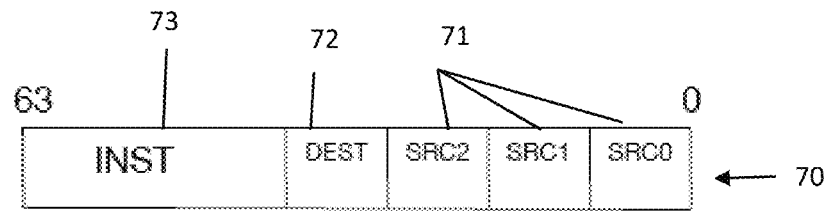
FIGS. 6a, 6b and 6c illustrate example instruction coding for the instructions included in the program to be executed by the execution unit in embodiments of the technology described herein, with FIG. 7 showing an example coding for the part of the instruction which indicates which data source is to be used for reading input data value(s)
Figure 6B:
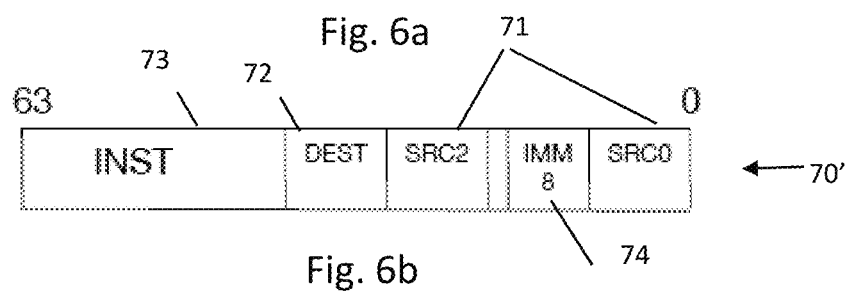
Figure 6C:
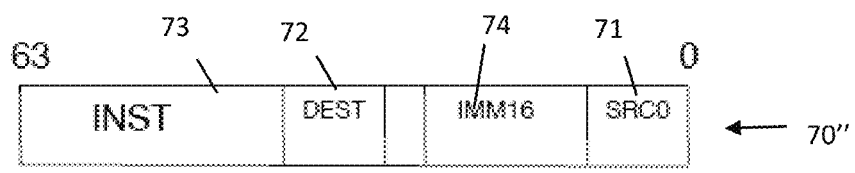

FIGS. 6*a*, 6*b* and 6*c* show example encodings (opcode) for instructions 70, 70', 70" used in embodiments of the technology described herein. The instructions shown are 64-bit instructions.

The instructions comprise one or more (e.g. three) source fields 71 (SRC0, SRC1, SRC2) each indicating a data source from which input data values are to be read from when the instruction is executed.

The data source indicated in the source field 71 can be any suitable and desired data source from which input data values are to be read. This could be, for example, be a data source (e.g. register) 50 accessible to the execution unit which is of the type that is controlled in response to 'no longer required to be retained' indications (a 'shifting register', e.g. within the tile buffer 48), or a data source accessible to the execution unit which is not controlled in response to 'no longer required to be retained' indications (a 'normal' register, e.g. within buffer 46).

The source fields 71 (SRC0, SRC1, SRC2) could use a mixture of data sources which are and are not of the type controlled in response to 'no longer required to be retained' indications (a mixture of 'shifting' registers and 'normal' registers).

One or more of the source fields 71 could be replaced by immediate data 74 (e.g. 8-bit data, IMM8, shown in FIG. 6*c*, or 16-bit data, IMM16, shown in FIG. 6*c*) so that the instruction contains one or more hard-coded input data values to be used when performing data processing operation(s) for the instruction.

Figure 7:
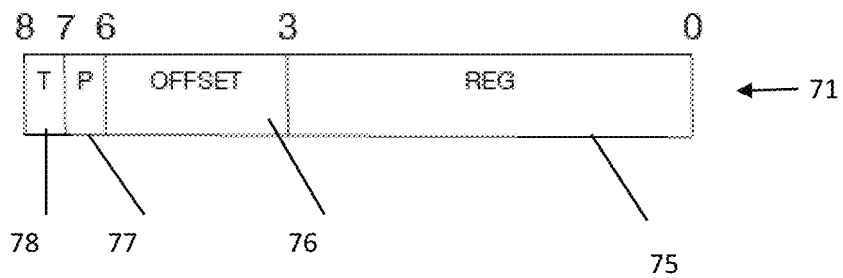

FIG. 7 shows the source field 71 in more detail. It includes an indication of which data source (register) which input data is to be read from (the register field 75)

The source field 71 also contains an indication of whether the data source is of the type which is controlled in response to 'no longer required to be retained' indications (the type field 78, "T", at bit 8). When the type field 78 is high (e.g. T=1) then the data source is of the type controlled in response to 'no longer required to be retained' indications (is a shifting register), whereas when the type field 78 is low (e.g. T=0) the data source is not of the type controlled in response to 'no longer required to be retained' indications (is a normal register).

When the data source is of a type controlled in response to 'no longer required to be retained' indications (T=1), then an offset field 76 (at bits [3:6]) indicates the data value (storage location) from which an input data value is to be read as an offset compared to the head pointer 54 of the data source. In an embodiment the offset provided in the source field is configured such that the storage location indicated falls within the queue of valid input data values which are required to be retained 55 (i.e. falls before the tail pointer 53).

The source field 71 further comprises an indication of whether one or more data values are no longer required to be retained in the data source (a 'no longer required to be retained' indication 77, "P"). The 'no longer required to be retained' indication is used (set) only when the data source is of a type which is controlled in response to 'no longer required to be retained indications' (only for 'shifting registers') (only when the values of the type field 78 is high).

The 'no longer required to be retained' indication in field 77 is in an embodiment a flag occupying only a single bit, which simply indicates whether or not data values are no longer required to be retained (and so indicates whether or not a shift of the head pointer 54 should be performed for the data source). For example when the field 77 has a high value, e.g. 1, one or more data values are no longer required to be retained and a shift should be performed, whereas when the value is low, e.g. 0, no shift is to be performed. The value may, by default, be set to low, e.g. 0, for data sources which are not controlled in response to 'no longer required to be retained' indications.

In an embodiment, (the storage management circuit 412 of) the data processing system, in response to the execution unit executing an instruction indicating that one or more data values are no longer required to be retained (indicating in field 77 that a 'shift' should be performed) shifts the head pointer 54 of the data source indicated in the register field 75 according to the amount indicated in the offset field 76 (and in an embodiment by the offset amount plus one data storage location). This causes all data values up to (and in an embodiment including) the data value read by the execution unit in response to the instruction to be removed from the set of data values required to be retained (which are accessible for reading by the execution unit) 55 (and to accordingly fall outside the head pointer 54, and become part of the set of data values no longer required to be retained 56). This configuration therefore allows all data values older than the data value currently read to be removed from the set of data values required to be retained 55 when a 'no longer required to be retained' indication is encountered. The number of data values removed is accordingly variable, depending on the position of the data value which the instruction causes the execution unit to read (i.e. depending on the offset field 76).

Accordingly, field 77 can be considered as an indication of whether (or not) the offset 76 number of data storage locations (data values) should be removed from the set of storage locations storing data values (the queue of data values) required to be retained 55.

Alternatively, the no longer required to be retained indication 77 could specify the number of data values no longer required to be retained (and so specify the shift amount).

If desired, for a data source used for storing input data values (a data source indicated in a source field 77) after performing the shift operation, (the storage management circuit 412 of) the data processing system could then indicate that space that has been 'freed up' in the data source to trigger loading of new input data values into the data source by a background process (e.g. if the background process has stalled due to lack of space in the data source).

Referring back to type field 78, when the data source is of a type not controlled in response to 'no longer required to be retained' indications (when T=0), then the offset field 76 may indicate the data value (storage location) to be read as an offset compared any suitable and desired storage location of the data source (e.g. a base storage address). The execution unit can then read the input data value from the appropriate indicated data location. The 'no longer required to be retained' indication can remain unused (e.g. default to 0).

Alternatively, for a data source which is of a type not controlled in response to 'no longer required to be retained' indications, any of the type field 78, 'no longer required to be retained' field 77 and offset field 76 may be omitted from the instruction opcode. In this case, for example, all 9 bits [8:0] of the source field 71 could be used to specify a register which is to be accessed for reading an input data value, which would allow access to up to 512 registers (if it is desired to have this number of registers). Thus, there may be a different source field 71 encoding for 'normal' registers (not controlled in response to 'no longer required to be retained' indications).

Referring back to FIGS. 6*a* to 6*c*, instructions also include an 'instruction' field 73 (opcode) indicating the data processing operation(s) to be performed using the input data values (obtained from the indicated data sources 71 and/or the immediate data values 74 in the instruction).

The data processing operation indicated in the instruction field 73 may be an arithmetic operation (for example, add, subtract, multiply, divide, multiply-accumulate (MAC) etc.), bit manipulations (for example, invert, swap, shift, etc.), logic operations (for example, AND, OR, NAND, NOR, NOT, XOR, etc.), load-type instructions (for example, such as varying, texturing or load instructions in the case of graphics processing), or store type instructions (such as blend or store instructions in the case of graphics processing). In the case of a program requiring neural network processing, a data processing operation indicated in one or more consecutive instructions in the sequence of instructions for the program (and requiring use of source and/or destination registers of the type controlled in response to 'no longer required to be retained' indications) may be a multiply-accumulate (MAC) operation.

Instructions may further include a 'destination' field 72 indicating a destination to which output data values generated when performing the indicated data processing operation 73 are to be written to.

The destination field may have the same structure as shown for the source field 71 in FIG. 7. Thus, the destination field may indicate which register an output data value is to be written to (register field 75). The destination field 72 may indicate whether the data source is of the type controlled in response to 'no longer required to be retained' indications (type field 78), indicate the offset of the storage location within the data source to which the output data value is to written (in offset field 76) and indicate (in field 77) whether one or more data values in that data source are no longer required to be retained (whether a 'shift' should be performed).

In embodiments, as discussed above, when writing output data values to a shifting register 50, they are (usually) written at the data location after the tail 53 (unless overwriting a partial result stored in data locations 55). This may be achieved by providing (in offset field 76) an offset relative to the head 54 of the data values 55 required to be retained, which offset value will accordingly be set to the tail value (or the tail value plus one data storage location).

Alternatively, the location to which data value(s) are to be written could be determined in any other suitable and desired way (e.g. by providing an offset value in the offset field 76 relative to the tail 53, or by the storage management 412 circuit being provided with appropriate logic (circuits) to cause output data values to be written to the tail 53 when the data source is of the type controlled in response to 'no longer required to be retained' indications (unless indicated otherwise).

When an output data value is written to a data location after the tail 53, the storage management circuit 412 may update the tail pointer to encompass that new output data value within the queue of valid data values 55.

Similarly to the discussion with regards to the source field, the 'no longer required to be retained' indication in field 77 may simply indicate whether or not data values are no longer required to be retained (whether or not a shift should be performed), e.g. with P=1 indicating that a shift should be performed, and P=0 indicating that no shift is to be performed. In this case, similarly to the discussion with regards to the source field, (the storage management circuit 412 of) the data processing system, in response to the execution unit executing an instruction indicating in field 77 that a 'shift' should be performed, may shift the head pointer 54 of the data source indicated in the register field 75 according to the amount indicated in the offset field 76 (and in an embodiment by the offset amount plus one data storage location). This causes all data values up to (and in an embodiment including) the data value written to the data source when executing the execution unit 55 to fall outside the head pointer 54, and become part of the set of data values no longer required to be retained 56.

Alternatively, similarly to the discussion with regards to the source field, the 'no longer required to be retained' indication in field 77 for a destination field may indicate the number of data values no longer required to be retained (and so indicate a shift amount).

The (storage management circuit 412 of the) data processing system may be configured to, (immediately) in response to the execution unit executing an instruction containing a 'no longer required to be retained' indication, write out to memory all of the data values from the head 54 up to the offset position indicated in field 76 (in an embodiment the offset plus one) before performing the shift operation.

Alternatively, and in an embodiment, data values which are 'no longer required to be retained' in instructions that are executed are written to memory as a background process (by a suitable algorithm) by storage management circuit 412 of the data processing system. To do this, the storage management circuit 412 may keep track of which data values have been written out to memory.

Similarly to the discussion with regards to the source field 71, when the destination field 72 indicates that a register which is not of the type controlled in response to 'no longer required to be retained indications' (e.g. a 'normal' register) is to be used, then the type field 78 may be set accordingly (to T=0), the shift field 77 not used (e.g. defaulting to P=0), and the offset 76 to which the output data values is to written provided relative to a base memory address of the register. Alternatively, similarly to the above discussion, any of the type field 78, shift field 77, and offset field 76 may be omitted.

As will be apparent from the above discussion, any one or more of the data sources indicated for use when executing an instruction (by source fields 71 and/or destination field 72) can be of the type which are controlled in response to 'no longer required to be retained' indications (as indicated by type field 78). Thus, an instruction can use a mixture of data sources which are and are not of the type controlled in response to 'no longer required to be retained' indications (can use a mixture of 'shifting' and 'normal' registers) and/or immediate data.

The data sources indicated in source field 71 (SCR0, SCR1, SCR2) and the destination field 72 could overlap, such that same data source is indicated for multiple of the source fields and/or the destination field. Alternatively, and in an embodiment the data source indicated in the destination field 72 (used for storing output data values) is different from any of the data sources indicated in the source fields 71 (used for storing input data values).

Although not shown, the instruction could also indicate (e.g. in the source field 71 and/or destination field 72) a data type for the source and/or destination data source, for example selected from one or more of: signed integer (e.g. int8, int16, and/or int32), unsigned integer (e.g. uint16), floating point (e.g. fp16, or fp32), brain floating point e.g. bfp16).

Figure 8:
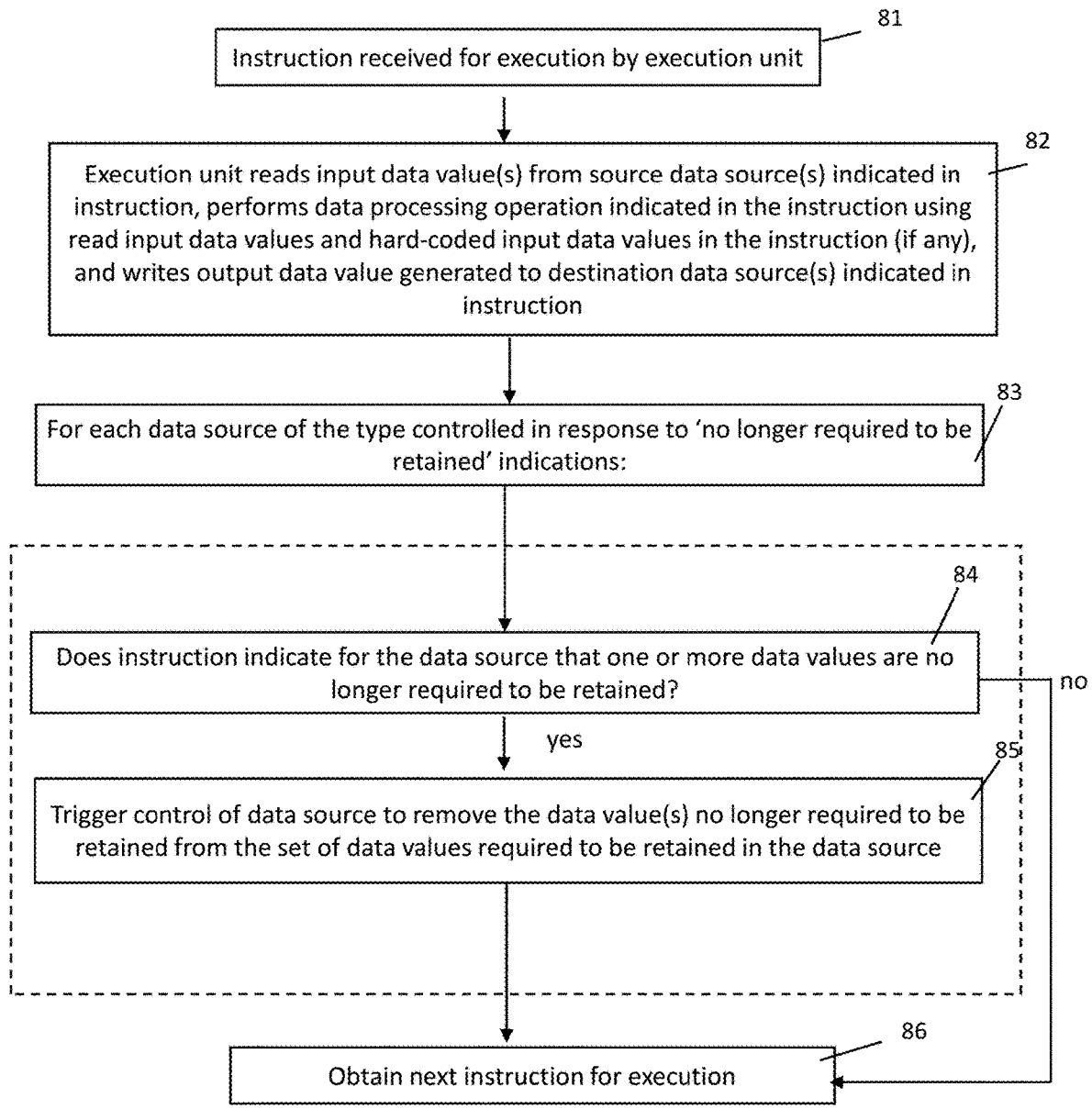
FIG. 8 is a flow chart showing the control of storage in response to 'no longer required to be retained' indications in instructions being executed.

FIG. 8 is a flow chart showing control of data sources in response to 'no longer required to be retained' indications in instructions.

As shown in FIG. 8, when an instruction in the sequence of instructions for a program is to be executed by the execution unit (step 81), the execution unit reads the input data value(s) from the data source(s) indicated in the instruction (step 82) (the input data values to be read may be determined based on the register field 75, offset field 76 and type field 78 in the source fields 71 of the instruction as discussed with respect to FIG. 7). The execution unit also performs the data processing operation indicated in the instruction (in the instruction field 73), using the read input data value(s) and any hard-coded input data values (indicated in immediate data 74 for the instruction), and writes the output data value generated to the destination data source indicated in instruction (in destination field 72).

(Alternatively, a destination data source could be omitted from the instruction, in which case the output data value could instead, e.g., be written to a predetermined storage location (e.g. to a buffer or main memory), or streamed (e.g. to another data processor).

For each data source which is of the type that is controlled in response to 'no longer required to be retained' indications (as indicated in the type field 78) (step 83), the execution unit checks whether the instruction contains an indication that the data source contains one or more data values that are no longer required to be retained (step 84) (by checking shift indication 77 discussed with respect to FIG. 7). If the instruction contains an indication that the data source contains one or more data values that are no longer required to be retained, then the execution unit triggers control of the data source accordingly to remove those data values from the set of data values required to be retained 55 (step 85), for example by moving (shifting) the head pointer 54 for the set of data values required to be retained 55 according to the offset amount 76 as discussed herein. This may comprise the execution unit informing the storage management circuit 412 which controls the data source that a shift is to be performed as indicated in field 77, informing the storage management circuit of the shift/offset amount for example as indicated by the offset field 76, and informing the storage management circuit of which data source is to be shifted as indicated in the register field 75, with the storage management circuit then performing the shift.

As discussed herein, for a data source which is to be used for storing output data values (is indicated in the destination field 72), the storage management circuit may trigger the data value(s) no longer required to be retained (the data values stored at storage locations up to the offset amount 76) to be output, e.g. written out to a main memory 36, of the data processing system. Alternatively, outputting of data value(s) no longer required to be retained could be done as a background process by the storage management circuit (and not immediately in response to execution of an instruction with a 'no longer required to be retained' indication)

The execution unit then obtains the next instruction to be executed (step 87) and steps 81 to 86 are repeated for that instruction, and so on, until the last instruction in the sequence of instructions for the execution unit has been executed.

It is noted that although performing data processing using the read input data values (as indicated in step 82), is shown as being performed before triggering the shift operation (step 86), this could be done before, concurrently with, or after triggering the shift operation If a data source is not of the type that is controlled in response to 'no longer required to be retained' indications, or if it is of the type controlled in response to 'no longer required to be retained' indications but no 'no longer required to be retained' indication is present (as determined at step 84), then no shift operation is triggered.

In embodiments, consistent with the above discussion, in data sources controlled in response to 'no longer required to be retained' indications and storing input data values, those input data values which are still required for data processing operations are retained (as a queue, in the set of storage locations storing data values required to be retained 55, which are permitted to be read by the execution unit but not permitted to be overwritten), whilst input data values which are no longer needed are removed from the set (queue) of data values required to be retained 55 in response to 'no longer required to be retained' indications in instructions (by shifting the head pointer 54 of the set of storage locations storing data values required to be retained 55, so that one or more storage locations storing data values then fall within the set of storage locations 56 which are permitted to be written to).

Thus in embodiments, the set (queue) of data values required to be retained 55 in a data source is changed (shifted, by shifting head pointer 54) directly in response execution of an instruction indicating having a 'no longer required to be retained' indication.

In comparison, however, the loading of new input data values (into the set of storage locations not storing data values required to be retained 56 which are permitted to be written to) may be performed as a background process (by the storage management circuit 412), without reference to any 'no longer required to be retained' indications in instructions which are being executed.

In embodiments, when loading new input data values into a data source (register) which is controlled in response to 'no longer required to be retained' indications (e.g. such as a data source as illustrated in FIGS. 5*a* and 5*b*), the new data values are loaded (by the storage management circuit 412) from storage such as main memory 36 of the data processor. For example, in the case of neural network processing to be performed, the weight data and/or input feature map data for a layer of neural network processing may be stored in main memory.

Each data source which is controlled in response to 'no longer required to be retained' indications (and which is to store input data values) may have associated information (metadata) indicating how data values should be loaded from storage. Example metadata 90 is illustrated in FIGS. 9*a* and 9*b*.

The metadata 90 for a data source may be generated in advance of the execution 44 unit performing data processing operations for a program, for example by a compiler (as part of a compiling process). The metadata may be stored (e.g. in storage such as the main memory 36) as an appropriate data structure, with the storage management circuit 412 being provided with a pointer to the relevant metadata in storage for a (or each) data source. Alternatively, the metadata could be provided directly to the storage management circuit (for example programmed into the logic for the storage management circuit).

Alternatively, (rather than generating metadata in advance of executing instructions for a program), one or more instructions in the sequence of instructions for a program could be configured to (when executed by the execution unit 44) cause metadata 90 to be generated for the data source (and written to main memory and/or provided to the storage management circuit).

Figure 9D:
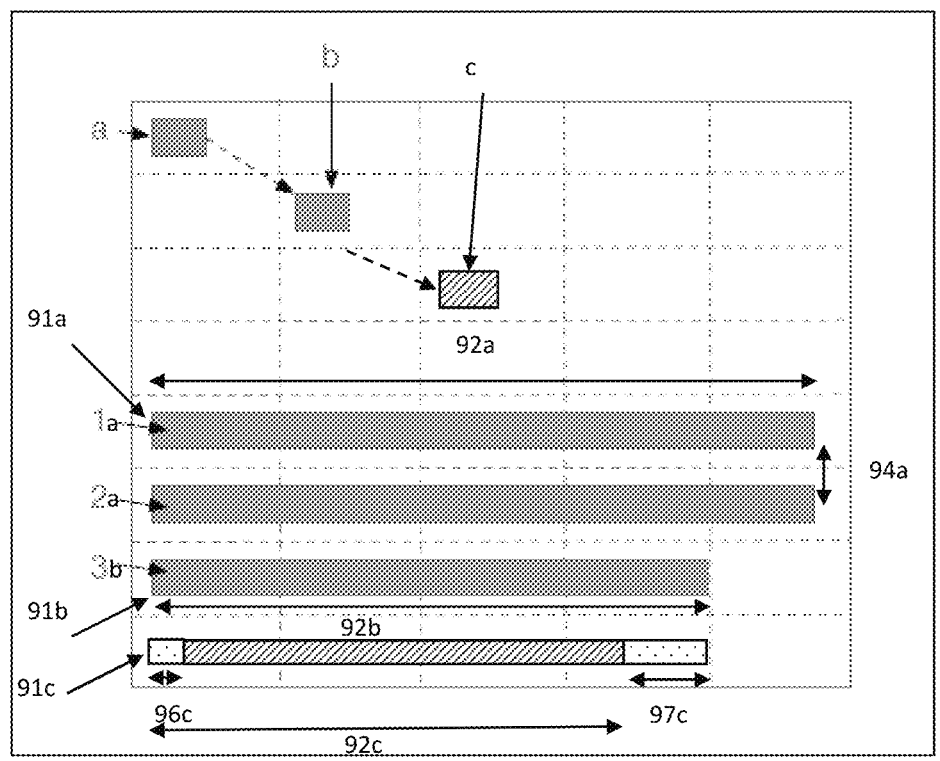
FIG. 9d shows example regions of memory accessed when loading data based on the memory fetch metadata.

The metadata 90 may be referred to herein as a "memory fetch packet" as it can be used to load a packet of data values of a defined size (from a defined region of memory). FIG. 9*d* illustrates example regions of memory storing data which are accessed when using data source metadata.

With reference to FIG. 9*a*, the data source metadata 90 (memory fetch packet) may comprise an indication of the region of memory from which the data is to be loaded, in this example comprising a start address 91 in memory from which data is to be loaded (in this case a 64-bit address).

The data to be fetched from memory may be arranged in lines in memory. The metadata 90 may indicate the length 92 of data to be accessed along a (each desired) line of memory (in this case, consuming 24-bits of the memory fetch information).

The metadata 90 may also indicate an offset 94 between memory lines to be accessed (in this case, consuming 24-bits of the memory fetch information). This may be useful where the data desired to be accessed is not stored in contiguous lines in memory, the offset allowing skipping of memory lines which are not desired to be accessed.

The metadata 90 also includes a repeat value 95 which indicates the number of lines of memory which are to be accessed (and which in this case consumes 16-bits of the memory fetch information).

Example memory locations accessed when using such a memory fetch packet 90 are shown in FIG. 9*d*, with memory fetch packet "a" causing the lines in memory starting at location 91*a* to be read along a length 92*a*, with an offset 94*a* (in this case the offset is such that adjacent lines in memory are accessed without skipping of lines, however a larger offset could be used if one or more lines in memory are to be skipped), and a repeat value of one (so that an initial, and one additional line of memory are accessed). Memory fetch packet "b" on the other hand has a start address 91*b*, a shorter length 92*b*, and repeat value of zero (so that no further lines of memory are accessed after an initial line of memory is accessed). Other values for the length, offset, and repeat value could be used if desired.

To facilitate the fetching of data from memory in accordance with the metadata, as shown in FIG. 9*c*, a current address (current address register) 910, current count (current count register) 911 and current repeat (current repeat register) 912 may be tracked (as fetch tracking information 900, e.g. by a suitable logic of the storage management circuit 412 for the storage into which the data values are being loaded).

When a data source (register) is to fetch data according to a memory fetch packet (metadata), the tracking information is initialised, with the current address 910 being initially loaded with the start address 91 for the memory fetch packet, the current repeat value 911 set to the repeat value 95 for the memory fetch packet, and the current count 912 set to zero. Then, when a (each) data value is fetched into the data source, it is fetched from the memory location pointed to by the current address 910, and the current count 912 is incremented.

When the current count 912 reaches the length value 92 for the memory fetch packet, an offset corresponding to the offset 94 of the memory fetch packet is added to the current address 910 (which accordingly brings the current address to the start of the next line of memory desired to be accessed). If the current repeat value 912 is zero all data for the memory fetch packet has been fetched. If not, the current repeat value 912 is decremented and current count 911 is zeroed, and the next line of data is fetched in the same way, and so on until the repeat value reaches zero (at which point all of the data specified in the memory fetch packet will have been fetched).

FIG. 9*b* shows another example data source metadata (a memory fetch packet), which in addition to indicating a start address 91, length 92, offset 94 and repeat 95 (similar to that of memory fetch packet 90), also indicates a number of pad values (Pad0) 96 and (Pad1) 97 at the start and end of the length of the memory line respectively which are to be ignored and not loaded. Thus, if data in lines of memory contain pad values (which may have known values, for example being zero values) at the start and/or end of the line, then instead than loading those pad values from memory, the storage can be populated with (written with) the appropriate number of pad values. This may be applicable to, for example, machine learning programs in which 0 padding may be used, for example when processing boundary regions of a layer of processing This is illustrated in FIG. 9*d* in which memory fetch packet "c" causes a number of pad values 96*c* and 97*c* at the start and end of a memory line not to be fetched from memory.

In this case of metadata indicating a number of pad values 96, 97, when a data source (register) is to fetch data according to a memory fetch packet (metadata), the fetch tracking information 900 is initialised by loading the current address 910 with the start address 91 for the memory fetch packet, setting the current repeat value 911 to the repeat value 95 for the memory fetch packet, and setting the current count 912 to zero. Then, when populating the data source with data values, if Pad0 is non-zero then the number of pad values specified by Pad0 are written to the data source and the current count 911 is incremented by that number (whereas if Pad0 is zero then no pad values are written to the data source and the current count 911 is not incremented). The pad values may be zero, or another (specified) padding value. Data values are then fetched from the memory location pointed to by the current address register 910, and the current count 912 is incremented, until the current count 912 reaches the length value 92. Then, if Pad1 is non-zero, the number of pad values specified by Pad1 are written to the data source (whereas if Pad1 is zero, then no pad values are written at this stage). The offset 94 is then added to the current address 910 (which accordingly brings the current address to the start of the next line of memory desired to be accessed). If the current repeat value 912 is zero all data for the memory fetch packed has been fetched. If not, the current repeat value 912 is decremented and current count 911 is zeroed, and the next line of data is fetched in the same way, and so on until the repeat value reaches zero (at which point all of the data specified in the memory fetch packet will have been fetched).

As shown in FIG. 9b, the memory fetch packet (metadata) for a data source may also include a pointer to a next memory fetch packet (next metadata) for that data source, so that once all of the data for a memory fetch packet (specified by the metadata) has been loaded into the data source, data for the next memory fetch packet (next metadata) can then be (is) used for the data source (and the tracking information initialised accordingly for that next memory fetch packet). If the pointer 98 is zero (NULL) there is no further data to fetch, otherwise if the pointer 98 is non-zero the next memory fetch packet is used (e.g. with the next memory fetch packet being loaded from storage, e.g. main memory 36, in which it is stored). This is illustrated in FIG. 9d for example in which memory fetch packet "a" has a pointer to a next memory fetch packet "b" in main memory, which in turn has a pointer to a next memory fetch packet "c" in main memory.

The memory fetch metadata (memory fetch packet) 90 for a data source (register) of the storage 46, 48 accessible to the execution unit may be associated with the data source in any suitable and desired way. For example, the execution unit 44 could program memory fetch logic of the storage management circuit 412 for the storage (e.g. buffer 48, and/or tile buffer 46) with memory fetch metadata for the data sources (registers) in the storage. Alternatively, the memory fetch information could be stored in a data structure (e.g. in the main memory 36, e.g. as illustrated in FIG. 9d), and fetched by the management circuit 412 when it is desired to load data into a data source (register) in the storage accessible to the execution unit (e.g. tile buffer 48 and/or other buffer 46).

There may be multiple data sources (registers) which are controlled in the manner described herein, and which may have their own respective memory access patterns (and accordingly their own respective memory fetch metadata). Alternatively, if data sources have similar memory access patterns, then any one or more of the length 92, offset 94, Pad0 96, Pad1 97 and repeat 95 fields may be shared between data sources. The data sources will usually have different start addresses 91.

The memory access metadata (memory fetch packets) described herein can allow different data sources to access different parts of memory (as set out in their respective memory fetch packets). This can allow input data to be divided between different data sources, for example with different (e.g. alternating) lines of an input feature map (e.g. the input feature map being stored line-by-line in memory) being assigned to different data sources, which may improve throughput for data processing operations using that input data. Alternatively, for example, different blocks of plural lines of an input feature map could be loaded into different data sources.

The memory access metadata is described above in respect of data sources which are used for storing input data values for data processing operations, and accordingly in respect of loading data values from memory into data source.

However, memory access metadata (e.g. having one or more, or all, of the features shown and described with respect to FIGS. 9a to d), may also or instead be provided for data sources which are used for storing output data values generated when performing data processing operations, and the metadata accordingly used to identify memory locations to which data values which are 'no longer required to be retained' are to be written out to memory (which, as discussed above, may be triggered directly by 'no longer required to be retained' indications in instructions, or done as a background process).

For example, when used for writing out data values to memory, the memory access metadata 90 (forming a 'memory write packet') may indicate any one or more of: the start address 91 in memory to which data is to be written; the length 92 of memory locations to be written to along a (each desired) line of memory; the offset 94 between memory lines to be written to; and the repeat value 95 for the number of lines of memory to be written (as shown in FIG. 9a).

To facilitate the writing of data to memory in accordance with the metadata, as shown in FIG. 9c, a current address (current address register) 910, current count (current count register) 911 and current repeat (current repeat register) 912 may be tracked (as write tracking information 900). The current address, current count, and current repeat may be incremented as data values are written to memory, in an analogous way as described above with regards to reading from memory.

For example, when a data source (register) is to write data to memory according to the memory fetch packet (metadata), the tracking information may be initialised with the current address 910 being initially loaded with the start address 91 for the memory write packet, the current repeat value 911 set to the repeat value 95 for the memory write packet, and the current count 912 set to zero. Then, when a (each) data value is written to the data source, it is written to the memory location pointed to by the current address 910, and the current count 912 is incremented. When the current count 912 reaches the length value 92 for the memory write packet, an offset corresponding to the offset 94 of the memory write packet is added to the current address 910 (which accordingly brings the current address to the start of the next line of memory desired to be written to). If the current repeat value 912 is zero all data for the memory write packet has been written to memory. If not, the current repeat value 912 is decremented and current count 911 is zeroed, and the next line of data is written to in the same way, and so on until the repeat value reaches zero (at which point all of the data specified in the memory write packet will have been written to memory).

Alternatively, metadata may be of the type shown in FIG. 9b, additionally indicating a number of pad values (Pad0) 96 and (Pad1) 97 which are to be written at the start and end of the length of the memory line respectively.

Similarly to the above discussion with regards to FIG. 9b, the memory write packet (metadata) for a data source may also include a pointer to a next memory write packet (next metadata) for that data source, so that once the memory locations specified by a memory write packet (specified by the metadata) have been written to, data values are then written to the memory locations specified by the next memory write packet (next metadata). Thus, memory access metadata 90 may be provided for indicating which memory locations are to be used when loading data values into and/or writing data values out from data source of the type controlled in response to 'no longer required to be retained' indications.

Thus, (e.g. when performing neural network processing), there may be memory access data for fetching input data values (e.g. for fetching each of an input feature map and/or a weight data array) from memory, and further memory access data for writing output data (e.g. corresponding to an output feature map) to memory.

When loading data values into a data source of the type controlled in response to 'no longer required to be retained' indications, data is in an embodiment loaded into the data sources in batches (bursts) having a size based on the size of a memory "transaction" in the data processing system, such as the size of a cache line, for example being equal to or greater than 64 B.

For data sources of the type controlled in response to 'no longer required to be retained' indications, batches of data are loaded as a background process as space becomes available (in the set of storage locations not storing data required to be retained 56 to which new data values are permitted to be written).

Figure 10:
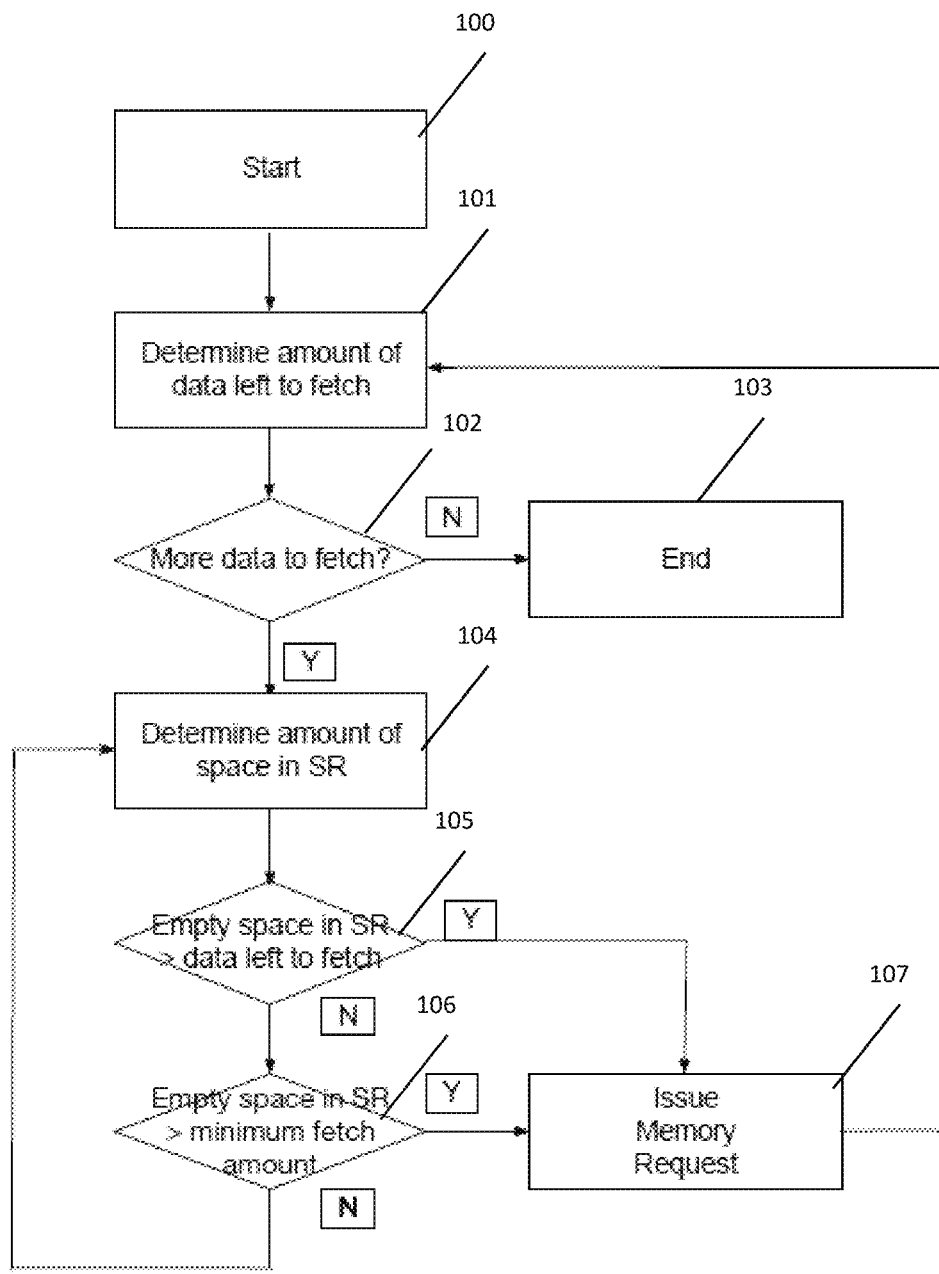
FIG. 10 is a flow chart showing an example process for loading of data into a data source in embodiments of the technology described herein.

FIG. 10 is a flow chart showing a method for loading data values into a data source of the type controlled in response to 'no longer required to be retained' indications, as a background process (occurring in parallel with execution of instruction by the execution unit 44). The loading of data values (as described with regards to FIG. 10) may be controlled (performed) by the storage management circuit 214, for example according to a suitable algorithm.

When data is to be loaded into the data source (step 100), as may be specified in memory fetch metadata (a memory fetch packet) for the data source, the amount of data left to load (fetch) for the memory fetch packet is determined (step 101).

If it is determined that there is more data to be loaded (at step 102), then the amount of space in the data source (the number of data locations 56 not storing data values required to be retained) is determined (step 104).

The amount of space in the data source may be determined in any suitable and desired way. For example, the data processing system (storage management circuit) could maintain a running count of the number of data storage locations storing data values required to be retained 55.

For example, where:

Tail pointer=Tail+Start_Address

Head pointer=Head+Start_Address

End Address=Start_Address+End (in other words, where the tail pointer 53 is a storage location which is offset a "tail" amount from the start address 51 of the data source, and the head pointer 54 is a storage location offset a "head" amount from the start address 51, and the end address 52 is an "end" offset from the start address 51), then the count may be determined as:

Count=Tail−Head (if Tail≥Head)

=(End−head)+Tail (if Tail<Head)

In other words, with reference to FIG. 5a, if the tail pointer 53 is the same as or ahead of (greater than) the head pointer 54, then the number of data storage locations occupied by data which is required to be retained 55 is the difference between the tail and head offsets from the start address. However if, as shown in FIG. 5b, the head pointer 54 is ahead of the tail pointer 53, then the number of data storage locations occupied by data which is required to be retained 55 is the difference between the end and tail offsets for the storage address, plus the tail offset.

The amount of space (number of storage locations not storing data required to be retained 56) can then be calculated by subtracting the Count from the total amount of space (size) of the data source (corresponding to the number of storage locations between the start 51 and end 52 of the data source).

If the amount of space (number of storage locations not storing data required to be retained 56) in the data source is greater than the amount of data left to fetch (as determined at step 105 of FIG. 10) then the data is fetched (by issuing a memory request) (step 107). When the data has returned from memory, the data is then written at the at the memory locations immediately after the tail of the data source, and the tail pointer for the data values required to be retained 55 is updated to include the newly written data.

If the amount of space in the data source is less than the amount of data left to fetch (as determined at step 105), then it is determined whether the amount of space in the data source is greater than a minimum fetch amount (corresponding to a predetermined 'batch' size as discussed above) (step 106). If the amount of space is large enough to store a batch of data (if the amount of space is equal to or larger than the threshold, minimum fetch amount corresponding to a batch size) then a batch of data is fetched (by issuing a memory request) (step 107). When the data has returned from memory, the data is then written at the memory locations immediately after the tail of the data source, and the tail pointer for the data values required to be retained 55 is updated to include the newly written data.

However, if the amount of space in the data source is not large enough to storage a batch of data (is less than the minimum fetch amount) then the method will not fetch any data, and will return instead to checking the amount of space in the data source (return to step 104).

As discussed herein, space is 'freed up' (data locations are freed up for writing to) in the data source directly in response to execution of instructions having 'no longer required to be retained' indications (which trigger data locations to be removed from the queue/set of data locations storing data values required to be retained 55, by moving the head pointer 54). Once enough space is freed up in the data source (as determined at steps 105 and 106 of FIG. 10), data will be accordingly loaded into the data source (step 107).

Each time data is fetched (step 107), the method returns to step 101 determines the amount of data left to fetch, and so on. This continues until all data desired to be fetched (as specified in the memory fetch packet) has been fetched (as determined at step 102, ending the process for that memory fetch packet at step 103).

If at step 103 the memory fetch packet has a pointer to another memory fetch packet, the process shown in FIG. 10 may be performed again for the next memory fetch packet.

By loading data into the data source as a background process (as described with regards to FIG. 10), this allows data to be fetched ahead of when it is will be needed by the execution unit for performing data processing operations for program instructions. The loading is performed in dependence on the amount of 'free' storage space in the data source (which in turn may depend on the amount of space (size of the region of storage) allocated to the data source). The size of the data source may be selected (and for example adjusted, e.g. during execution of a program) depending on the latency for memory accesses (for example, so that when the memory system has a large latency, then more storage is provided). This can help to ensure that there is sufficient space to load data in advance of being required to be processed, thereby helping to reduce or indeed eliminating stalling of processing.

For a data source storing output data values generated during data processing operations, data values may be output to memory in batches (bursts), for example similarly having a size based on the size of a memory "transaction" in the data processing system, such as the size of a cache line, for example being equal to or greater than 64 B. Accordingly, output data values may be written out to memory when a sufficient, threshold, number of data values corresponding to a batch size have been written to (are currently stored in) a data source.

As discussed above, the writing out of data values from a data source to memory may be triggered directly in response to 'no longer required to be retained' indications in instructions. As the order of generation of output data values may be known in advance, (as part of e.g. a compiling process) 'no longer required to be retained' indications may be provided in instruction(s) of the sequence of instructions using a data source for storing an output data values, for those instruction(s) at which the number of output data values currently stored in the data source equals (or exceeds) a threshold number of data values (e.g. corresponding to the batch size).

Alternatively, the writing out of data values which are 'no longer required to be retained' from a data source may be done as a background process. In this case, the data processing system (storage management circuit) may keep track of which data values are indicated in instruction that have been execution as 'no longer required to be retained', and may write those data values out to memory in batches according to a background process (algorithm).

The above describes control of data sources in response to 'no longer required to be retained' indications in instructions in accordance with the technology described herein. Possible sequences of instructions for use with and consistent with the technology described herein are exemplified in more detail below.

For example, it may be desired to perform a Fused Multiply Accumulate (FMA) data processing operation (in which a multiply-accumulate, MAC, operation is performed in a single step), comprising multiplying a first input data value with a second input data value, and adding the result to a third input data value to generate an output data value. FMA data processing operations may be used for neural network processing, for example when applying a weight data array to an input feature map, as will be discussed in more detail below with regards to FIG. 12.

In embodiments of the technology described herein, an instruction of the type shown and discussed with regards to FIGS. 6a to 6c may indicate in the instruction field 73 that a (Fused) Multiply Accumulate operation is to be performed, for which an input data value from a (first) data source (e.g. a register R1) is to be multiplied with an input a data value from another (second) data source (e.g. a register R0), the result of the multiplication and added to an input data value from another (third) data source (e.g. a register R2) (each of these data sources indicated in respective source fields 71 of the instruction), with the final result written to a destination data source, (e.g. a register R3) (indicated in the destination field 72 of the instruction). This instruction can be written in short-hand as follows:

FMA R3, R2, R1, R0

Another example instruction could specify a Fused Multiply Accumulate operation in the instruction field 73, for which an immediate data value (e.g. the value 16) (indicated in immediate data 74 of the instruction) is multiplied by a data value read from register R0, the result of the multiplication added a data value read from register R2 (with R0 and R2 being indicated in source fields 71 of the instruction), and the final result written to the destination register R3 (indicated in the destination field 72 of the instruction). This can be represented as:

FMA R3, R2, #16, R0

Another example instruction could specify a Fused Multiply Accumulate operation in the instruction field 73, for which an immediate data value (e.g. 1000) (indicated in immediate data 74 of the instruction) is multiplied by a data value read from register R0 (indicated in a source field 71). It is possible for no accumulator register to be indicated in the instruction (no additional data source indicated in the source fields 71), in which case the result of the multiplication will instead be added directly to an existing data value in the destination register R3 (indicated in the destination field 72 of the instruction), and the final output written to the destination register. This can be represented as:

FMA R3, #1000, R0

Figure 12:
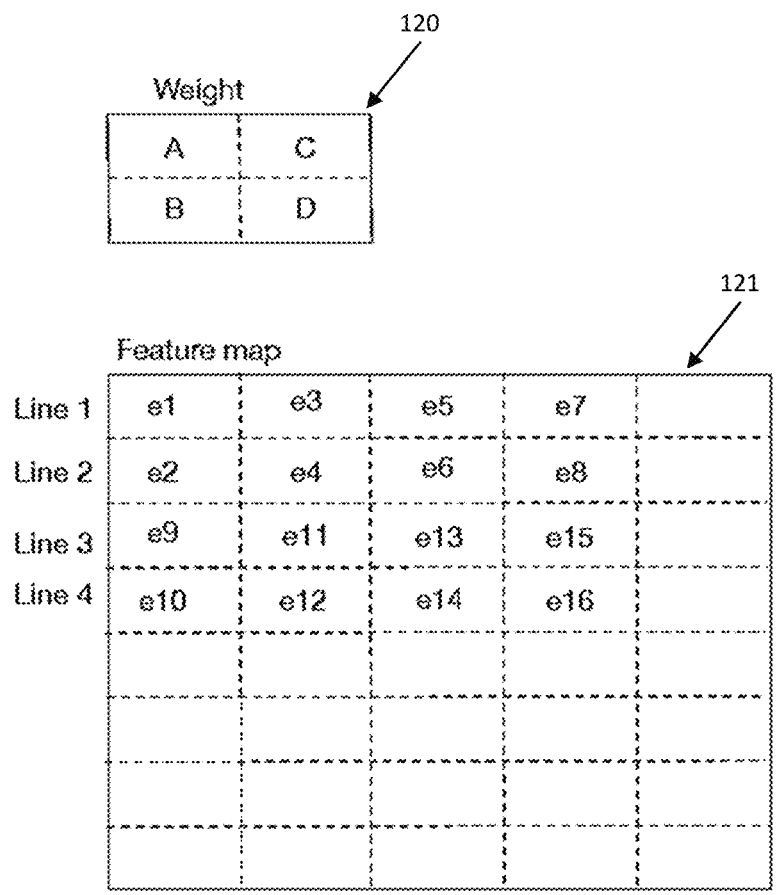
FIG. 12 illustrates an example weight kernel which may be applied to an input feature map when executing a program for neural network processing.

FIG. 12 shows an example weight data array ("filter" or "kernel") 120 which may be applied to an input data array (input feature map) 121 as part of a convolution operation of neural network processing, using fused multiply add (FMA) data processing operations.

The example weight data array 120 comprises a 2×2 array of data, having data values A, B, C and D. The input feature map 121 comprises a 4×4 array of data, comprising data values e1 to e16. Data arrays of a different e.g. larger, size could be used if desired.

Only a single channel of the convolution is shown. There may be multiple channels, so that the weight data array is a 2×2×c data array, and the input feature map is a 4×4×c data array (where "c" is the number of channels).

If the weight array is to be applied to the input feature map with a stride of 1, then the first two output data values for the output feature map are therefore:

$$OFM1 = A*e1 + B*e2 + C*e3 + D*e4$$

$$OFM2 = A*e3 + B*e4 + C*e5 + D*e6$$

(where * indicates a multiplication)

This corresponds to moving the filter (weight data array) along a line of the input feature map with a stride of 1 (so that each time the filter is moved to generate another output data value for the output feature map it is moved by a single data value (position) of the input data array). In comparison, a larger stride would cause data values (positions) of the input feature map to be skipped as the filter is moved along the feature map, for example a stride of 2 causing the filter map to be moved by two data values (positions) when generating each next data value for the output feature map.

In embodiments of the technology described herein, when applying a weight data array to input feature map, either or both of the weight data array and input feature map can be read from data sources which are of the type controlled in response to 'no longer required to be retained' indications.

For example, a first register (S0) of the type controlled in response to 'no longer required to be retained' indications (a 'shifting' register) could loaded with the data values for odd lines of the input feature map, and a second register (S1) of the type controlled in response to 'no longer required to be retained' indications (a 'shifting' register) could be loaded with data values for even lines of the input feature map. This loading may be performed in the manner discussed herein, for example with input feature map values loaded from main memory, for example according to memory fetch metadata for the registers S0 and S1, in batches as a background process.

The output data values generated when applying the weight array to the input feature map could, for example, be written to 'normal' registers R0 and R1, not controlled in response to 'no longer required to be retained indications.

The weight data values could, for example, be provided in the instructions as immediate data #A, #B, #C, and #D.

In this case the sequence of instructions for computing OFM1 and OFM 2 can be as follows:

| | | |
|---|---|---|
| Compute OFM1: | | |
| FMA R0, #A, S0 | | ; so, R0 = (A*e1), where e1 is read from the head 54 of the set of data values 55 accessible for reading in register S0 with no offset, multiplied with immediate data #A, and the result written to register R0 |
| FMA R0, #B, S1 | | ; R0 = R0 + (B*e2), where e2 is read from the head 54 of the set of data values 55 accessible for reading in register S1 with no offset, multiplied with immediate data #B, and the result accumulated with the data value already in register R0; Effectively this results in R0 = (A*e1) + (B*e2) |
| FMA R0, #C, S0 + 1 | | ; R0 = R0 + (C*e3), where e3 is read from register S0 with offset 1 from the head 54, multiplied with immediate data #C, and the result accumulated with the data values already in register R0; Effectively this results in R0 = (A*e1) + (B*e2) + (C*e3) |
| FMA R0, #D, S1 + 1 | | ; R0 = R0 + (D*e4), where e4 is read from register S1 with offset 1 from the head 54, multiplied with immediate data #D, and the result accumulated with the data values already in register R0; Effectively this results in R0 = (A*e1) + (B*e2) + (C*e3) + (D*e4) |
| Compute OFM2: | | |
| FMA R1, #A, S0 + 1.P | | ; R1 = (A*e3), with e3 being read from register S0 with offset 1. The ".P" indicates that a 'no longer required to be retained' indication is present in the instruction, which triggers the head pointer 54 for register S0 to be shifted past the offset amount 1, with the effect that data values e1 and e3 stored at offset 0 and 1 respectively are removed from the set of data values accessible for reading by the execution unit 55, and are now permitted to be overwritten for the purposes of loading new data values in to the register S0. In other words, this causes e1 and e3 to be removed from the queue of data values required to be retained. |
| FMA R1, #B, S1 + 1.P; | | ; R1 = R1 + (B*e4), with e4 being read from register S1 with offset 1. Effectively this results in R1 = (A*e3) + (B*e4). The 'no longer required to be retained' indication (".P") triggers the head pointer 54 for register S1 to be shifted past the offset amount 1, with the effect that data values e2 and e4 stored at offset 0 and 1 respectively are removed from the set of data values accessible for reading by the execution unit 55; |
| FMA R1, #C, S0; | | ; R1 = R1 + (C*e5), with e5 now being read from register S0 with offset 0. (Since data values e1 and e3 have been shifted out of the queue of data values for register S0, the head pointer 54 now points to data value e5); Effectively this results in R1 = (A*e3) + (B*e4) + (C*e5) |
| FMA R1, #D, S1 | | ; R1 = R1 + (D*e6); with e6 now being read from register S1 with offset 0. (Since data values e2 and e4 have been shifted out of the queue of data values for register S1, the head pointer 54 now points to data value e6); Effectively this results in R1 = (A*e3) + (B*e4) + (C*e5) + (D*e6) |

As can be seen from the above sequence of instructions using registers S0 and S1 which are of the type controlled in response to 'no longer required to be retained' instructions, once input data values in those registers (e.g. such as e1 and e3 in register S0, or e2 and e4 in register S1) are fall out of use (e.g. as the weight filter is moved across the input feature map) then a 'no longer required to be retained' indication can be provided in the instruction.

As discussed above, the 'no longer required to be retained' indication has the effect of removing data values from the queue of data values required to be retained, allowing those data values to then be overwritten as new data values are loaded into the register as part of a background loading process.

In this way the sequence of instructions may not require any load instructions (which cause data values to be loaded from memory), since the loading of data values into the register can progress as a background process as space is 'freed up' due to the shifting in response to 'no longer required to be retained' indications.

The weight data array could be sparse, with many of the weight data values being 0 so that these weights have no effect (which may commonly occur in machine learning). If weights A and D are zero, for example, then the sequence of instructions could be as follows:

| Compute OFM1: | |
|---|---|
| MOV S0.P | ; Shift out first value from register S0 |
| FMA R0, #B, S1.P | ; R0 = (B*e2); with e2 being read from register S1, and then being shifted out of register S1; |
| FMA R0, #C, S0.P | ; R0 = R0 + (C*e3), with e3 being read from register S0, and then shifted out of register S0; Effectively this calculates OFM1 in R0 = (B*e2) + (C*e3) |
| Compute OFM2: | |
| FMA R1, #B, S1.P | ; R1 = (B*e4), with e4 being read from register S1, and then shifted out of register S1; |
| FMA R1, #C, S0.P | ; R1 = R1 + (C*e5), with e5 being read from register S0, and then shifted out of register S0; Effectively this calculates OFM2 in R1 (B*e4) + (C*e5) |

In the above example, the output feature map data values (e.g. OFM1 or OFM2) (the 'partial' results for the overall output feature map) are written a normal register, e.g. R0, R1, not controlled in response to 'no longer required to be retained' indications (as are the results of FMA data processing operations performed when generating the output feature map data values). Where there are many output feature map data values to be generated, there may be an insufficient capacity in normal registers to store all of output feature map data values results simultaneously, and so it may be necessary to write data values to main memory (using a STORE instruction) if normal registers are used.

In alternative embodiments, output data values generated when performing data processing operations for instructions (e.g. data values generated when applying a weight data array to an input feature map) could be written to a data source which is of the type controlled in response to 'no longer required to be retained' indications disclosed herein (a 'shifting' register).

In this case, the sequence of instructions above where weight data values A and D zero becomes:

| MOV S0.P | ; Shift out first value from shift register 0 |
|---|---|
| Loop: | |
| FMA S2, #B, S1.P | ; S2 = (B*e2), where the destination register is a 'shifting' register S2, and the output data value is written to the tail of the register S2 (corresponding to zero offset from the head of register S2) |
| FMA S2.P, #C, S0.P | ; S2 = (B*e2) + (C*e3), which is the result for OFM1, the result is written so as to overwrite the partial result currently at zero offset from head of register S2, the head pointer then being shifted (as triggered by the 'no longer required to be retained' indication ".P"). The next partial computation (in this case OFM2) can then write at an offset from the new head of the shift register. |
| Branch to Loop: if not complete | ; permits next partial computation to be performed until complete |

The above examples are in comparison to scenarios where only 'normal' registers are used (without any control in response to 'no longer required to be retained' indications), which would require separate LOAD instructions in order to populate the registers from which input data values are to be retrieved, for example as follows:

Compute OFM1:

| | |
|---|---|
| LOAD.16 R2, [R4], #0 | ; Load e1 into register R2 |
| LOAD.16 R3, [R5], #0 | ; Load e2 into register R3 |
| FMA R0, #A, R2 | ; R0 = A*e1 |
| FMA R0, #B, R3 | ; R0 = R0 + (B*e2); Effectively: (A*e1) + (B*e2) |
| LOAD.16 R2, [R4], #1 | ; Load e3 into R2 |
| LOAD.16 R3, [R5], #1 | ; Load e4 into R3 |
| FMA R0, #C, R2 | ; R0 = R0 + (C*e3); Effectively: (A*e1) + (B*e2) + (C*e3) |
| FMA R0, #D, R3 | ; R0 = R0 + (D*e4); Effectively: (A*e1) + (B*e2) + (C*e3) + (D*e4) |

Compute OFM2:

| | |
|---|---|
| FMA R1, #A, R2 | ; R1 = A*e3 |
| FMA R1, #B, R3 | ; R1 = R1 + (B*e4); Effectively: (A*e3) + (B*e4) |
| LOAD.16 R2, [R4], #2 | ; Load e5 into R2 |
| LOAD.16 R3, [R5], #2 | ; Load e6 into R3 |
| FMA R1, #C, R2 | ; R1 = R1 + (C*e5); Effectively: (A*e3) + (B*e4) + (C*e5) |
| FMA R1, #D, R3 | ; R1 = R1 + (D*e6); Effectively: (A*e3) + (B*e4) + (C*e5) + (D*e6) |

Whereas, by using data sources of the type controlled in response to 'no longer required to be retained' indications for storing input data values, it is possible to perform plural successive data processing operations (e.g. FMA data processing operations), and for example all of the FMA data processing operations for applying a weight data array to an input data array to generate an output data array (and accordingly, for example, all of the data processing operations for a layer of neural network processing), without the need for load instructions for loading the input data array from memory into the data sources controlled in response to 'no longer required to be retained' indications, and with a reduced total number of instructions.

For instance, in the example given, when using 'load' instructions, 14 instructions must be executed to generate OFM1 and OFM2. Whereas when using data sources controlled in response to 'no longer required to be retained' indications ('shifting' registers) whereas with shifting registers the same output can be generated with for example only 8 instructions (a ~40% reduction in the number of instructions). As discussed above, by loading data into the shifting registers in advance of being needed, the occurrence of stalls can also be avoided.

In embodiments, instructions (in a sequence of instructions to be executed for a program) which use (indicate) a data source of the type controlled in response to 'no longer required to be retained' when executed cause data processing operations to be performed (only) using data values already stored in the data source, and do not require data to be loaded (do not specify that data is to be loaded) from other storage, e.g. main memory. Thus, in an embodiment when compiling a program to be executed using 'shifting' registers, the compiler does not insert any load instructions for data sources of the type controlled in response to 'no longer required to be retained' indications.

Whilst the above examples show weight data values being provided as immediate data in instructions, weight data values (of the weight data array) could be stored in a data source (registers) of the type controlled in response to 'no longer required to be retained' indications (with 'no longer required to be retained' indications then being present in instructions to trigger removal of weight data from the data source when the weight data falls out of use, for example when a next set (kernel) of weight data is to be used).

Thus, in in embodiments, input feature map data values and/or weight data values can be stored in (respective) data sources of the type controlled in response to 'no longer required to be retained' indications (or stored in 'normal' registers).

The above example sequences of instructions for applying a weight data array to an input feature map may be executed using an execution thread in the execution unit.

The execution unit could be part of a single instruction single data (SISD) data processor (a scalar register). Alternatively, the execution unit could be part of a SIMD (single instruction multiple data) data processor, in which case multiple lanes/channels could be processed at a time, for example processing different channels of an input feature map, or processing different regions of the input feature map).

Alternatively, and in an embodiment, the execution unit is part of a data processor which can execute plural execution threads (for example a group ("warp") of execution threads executing the same instructions, in lockstep), in which case each execution thread may have its own respective (dedicated) 'shifting' registers which it uses for performing data processing operations (being loaded (e.g. by way of associated memory fetch metadata, as a background process) with the input data values to be used for that execution thread, and/or to which the execution unit writes output data values for that execution thread).

For example, each execution thread may process a different channel of an input feature map, or process a different regions of the input feature map. For example, since the input feature map may be large (e.g. having 3840×2160 data values), then each execution thread (channel) of a thread group ("warp") may be configured to process a portion of the input feature map, for example with a first execution thread processing the first 540 lines of the input feature map, second execution thread processing the next 540 lines etc.

The instructions to be executed using data sources controlled in response to 'no longer required to be retained' indications, may be instructions for any suitable and desired program. In embodiments, the instructions may be for at least part of a program for performing neural network processing, for example for (at least part of) a layer of neural network processing, in which a weight data array is applied to an input data array (e.g. input feature map).

In this regard, for a neural network, the order in which layers of processing are performed, the order in which weight data and/or input feature map data are fetched from memory and used, and the order in which output feature map data is generated may be deterministic (and derivable in advance of performing the processing for the neural network), allowing instructions to be provided with 'no longer required to be retained' indications for data sources and allowing memory access patterns for data sources to be determined, in advance of performing the processing for the neural network.

Figure 11:
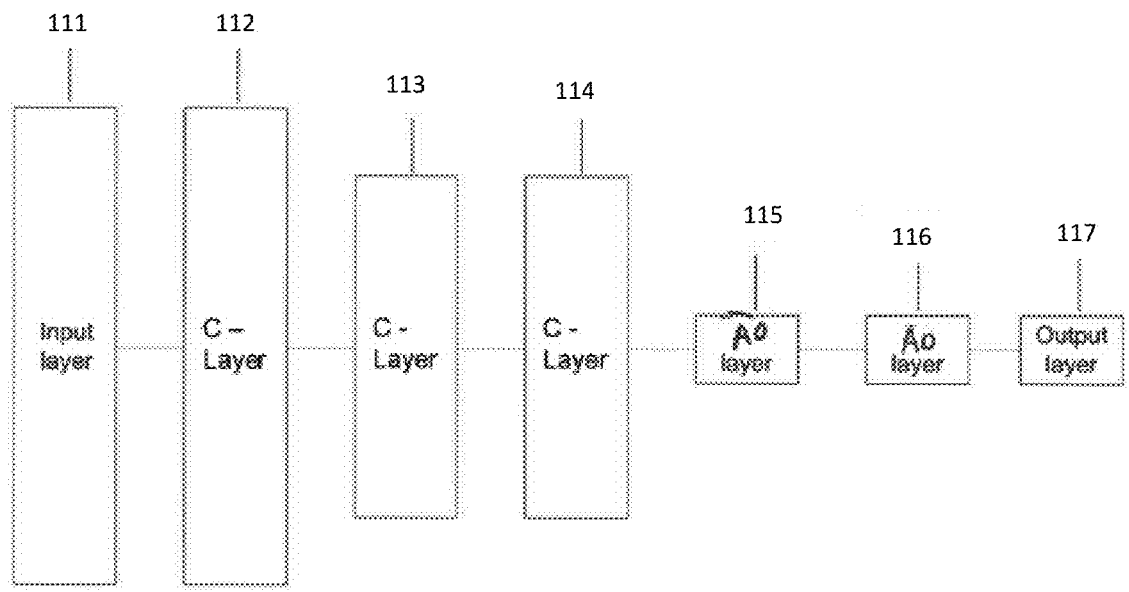
FIG. 11 illustrates an example neural network comprising processing layers which may be executed in embodiments of the technology described herein.

FIG. 11 illustrates an example sequence of neural network processing layers (in this case, for a convolutional neural network), any of which may be executed using data sources controlled in response to 'no longer required to be retained' indications as disclosed herein.

As illustrated in FIG. 11, neural network processing generally comprises a sequence of layers (operations) 111, 112, 113, 114, 115, 116, 117 which operate one after the other, such that the output from one layer is used as the input for a next layer.

In the example shown, the first layer 111 is an input layer, which may be adapted to receive input data (e.g. comprising data corresponding to image, sound data or other data). The input layer 111 may comprise a number of processing nodes which receive input data and pass that data on to the next layer of the neural network in a suitable format.

The next layer 112 may be convolutional (convolution) layer (C-Layer). The convolutional layer comprises an operation which applies a filter (weight data array) to an input data array (input feature map), in order to generate an output data array (output feature map).

A pooling layer may also be provided after the convolutional layer (in FIG. 11 these are both incorporated into the convolutional layer 112, although it is to be understood that they can comprise separate layers). The pooling (or "downsampling") layer may operate to reduce the size of an input data array (e.g. feature map) that is input into the pooling layer, to produce an output data array (output feature map) which may be an "equivariant" representation of the data array that was input into the pooling layer (meaning that the representation is almost invariant to changes in the scale and position of features in the data array that was input into the pooling layer). In embodiments the processing required for the pooling layer may comprise applying a filter to an input data array in order to generate the output data array.

After one or more further convolutional layers 113, 114, the neural network may comprise one or more elementwise layers 115, 116 (e.g. activation layers). The elementwise layers may operate on the data array (feature map) generated by the preceding convolutional and/or pooling layer, and perform elementwise operations, such as addition or subtraction. The output data array from the final elementwise layer 116 may comprise a useful output (e.g. an identification or classification of an object in the image data that was originally received by the input layer neural network).

The final elementwise layer 116 passes the useful output to the output layer 117 of the neural network. The output layer 117 may receive the useful output data and pass it on towards other components of the data processing system (e.g. such as further processing and display components which can display the output data, for example).

Although FIG. 11 shows a certain number and type of layers of operation, a neural network could comprise fewer or more (or different) layers if desired. Other layers present in the neural network may comprise, for example, fully connected layers, deconvolution layers (for which a deconvolution operation is to be performed), etc.

As will be appreciated from the above, the technology described herein, in embodiments, can provide improvements to the efficiency of accessing input data values when performing processing for a program being executed, by including in instructions indication(s) of whether data source(s) of the storage accessible to the execution unit contain data values which are no longer required to be retained, in response to which indication(s) data values can be cleared from the storage accessible to the execution unit, thereby freeing up space for new data values to be loaded into the storage from memory in advance of being needed (for example as a background process) and/or freeing up space for output data values newly generated during instruction execution to be written to the data source. This may reduce or eliminate the need for separate "load" instructions and/or for separate "store" instructions, and may reduce the occurrence of stalling otherwise caused by data values not being available in data sources. By retaining data in data source(s) until a 'no longer required to be retained' indication is encountered in an instruction, data re-use may be facilitated, and writing data out to memory may be delayed until such time as a 'no longer required to be retained' indication is encountered, saving energy associated with memory read and writes.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a data processing system, the data processing system comprising:
a data processor, the data processor comprising:
an execution unit configured to execute instructions in a program to be executed to perform data processing operations for execution threads executing the program; and
storage configured to store input data values for use by the execution unit when executing an instruction to perform a data processing operation for an execution thread and to store output data values generated by the execution unit when performing a data processing operation for an instruction being executed by an execution thread;
the method comprising:
the execution unit of the data processor executing an instruction indicating one or more data sources of the storage for use when performing a data processing operation, the instruction further more including an indication that one or more data values in a data source of the one or more indicated data sources are no longer required to be retained in said data source:
controlling storage of data values in the storage based on the indication in the instruction that one or more data values in a data source of the one or more indicated data sources are no longer required to be retained in said data source; and wherein each data source which is controlled based on indications that one or more data values are no longer required to be retained has associated metadata indicating a memory access pattern for loading data values from memory into the data source or for storing data values to memory from the data source, wherein the memory access pattern is permitted to differ between different data sources.

2. The method of claim 1, wherein controlling storage of data values in the storage based on the indication that one or more data values in a data source are no longer required to be retained, comprises:
making said one or more data values in said data source which are no longer required to be retained inaccessible for reading by the execution unit.

3. The method of claim 2, wherein controlling storage of data values in the storage based on the indication that one or more data values in a data source are no longer required to be retained comprises:
removing said one or more data values which are no longer required to be retained from the head of a queue of data values in the data source.

4. The method of claim 1, wherein the controlling storage of data values in the storage based on the indication that one or more data values in the data source are no longer required to be retained comprises:
invalidating one or more data values older than an input data value indicated to be read from the data source or an output data value to be written to the data source.

5. The method of claim 1, wherein the data processing system is configured to manage the data source which is controlled based on the indication that one or more data values are no longer required to be retained as circular storage.

6. The method of claim 1, comprising adjusting the size of the data source controlled based on the indication that one or more data values are no longer required to be retained, in dependence on any one or more of: memory access latency for the data processing system; a rate of use input data values when performing data processing operations for the program (data values consumption rate); and a rate of generation of output data values when performing data processing operations for the program.

7. The method of claim 1, wherein the storage comprises a plurality of data sources configured to store data values for use by the execution unit, and wherein the data processor is configured to control only a sub-set of the plurality of data sources based on indications in instructions that data values are no longer required to be retained.

8. The method of claim 1, wherein the instruction furthermore includes an indication of whether the indicated data source is of a type which is to be controlled based on indications that data values are no longer required to be retained.

9. The method of claim 1 comprising, when executing the instruction which includes an indication that one or more data values in a data source of the one or more indicated data sources are no longer required to be retained in said data source:
determining a location from which an input data value is to be read or to which an output data value is to be written based on an offset from a storage location at the head of a queue of data values required to be retained in the data source.

10. The method of claim 1, wherein controlling storage of data values in the storage based on the indication in the instruction that one or more data values in a data source of the one or more indicated data sources are no longer required to be retained in said data source comprises:
for a data source for which the data values required to be retained comprise one or more input data values for use when performing data processing operations, the data source having a storage capacity for storing data values, when at least a threshold amount of space in the data source is not occupied by data values which are required to be retained, loading one or more new data values into the data source; and/or
for a data source for which the data values required to be retained comprise one or more output data values from data processing operations, in response to an indication that one or more data values are no longer required to be retained, outputting from the data source those one or more data values which are no longer required to be retained.

11. The method of claim 1, wherein the metadata for a data source indicates one or more of: a start memory location for memory access; an amount of data to be accessed for each line in memory; a number of lines accessed in memory; a spacing between lines accessed in memory; and a number of memory locations at the start and/or end of each line which are to be used for padding values.

12. The method of claim 1, wherein the program is a machine learning program, and wherein:
one or more data sources to the storage are used to store input data values corresponding to an input feature map and/or weight data array to be processed during execution of the machine learning program; and/or
one or more data sources of the storage are used to store output data values corresponding to an output feature map generated during execution of the machine learning program.

13. The method of claim 1, wherein:
data values for any of an input feature map, a weight data array, or an output feature map respectively are stored so as to be divided among plural of the data sources of the storage accessible to the execution unit.

14. The method of claim 1, wherein the program is a machine learning program, and wherein one or more instructions for the program containing an indication that one or more data values in a data source are no longer required to be retained also indicate a data processing operation which is a multiply-accumulate operation.

15. A data processing system, the data processing system comprising:
a data processor, the data processor comprising:
an execution unit configured to execute instructions in a program to be executed to perform data processing operations for execution threads executing the program; and
storage configured to store data values for use by the execution unit when executing an instruction to perform a data processing operation for an execution thread and to store output data values generated by the execution unit when performing a data processing operation for an instruction being executed by an execution thread;
the data processing system further comprising a processing circuit configured to:
in response to the execution unit of the data processor executing an instruction indicating one or more data sources of the storage for use when performing a data processing operation, and the instruction furthermore including an indication that one or more data values in a data source of the one or more indicated data sources are no longer required to be retained in said data source:

control storage of data values in the storage based on the indication in the instruction that one or more data values in a data source of the one or more indicated data sources are no longer required to be retained in said data source;

wherein each data source which is controlled based on indications that one or more data values are no longer required to be retained has associated metadata indicating a memory access pattern for loading data values from memory into the data source or for storing data values to memory from the data source, wherein the memory access pattern is permitted to differ between different data sources.

16. The data processing system of claim 15, wherein the control of storage of data values in the storage based on an indication in an instruction that one or more data values in a data source are no longer required to be retained, comprises:

making said one or more data values in said data source which are no longer required to be retained inaccessible for reading by the execution unit.

17. The data processing system of claim 15, wherein the control of the storage of data values in the storage comprises:

checking whether an instruction being executed indicated that a data source is of a type which is to be controlled based on indications that one or more data values are no longer required to be retained, and if so checking whether the instruction contains an indication that one or more data values in the data source are no longer required to be retained, and if so controlling the storage of data values in the data source based on the indication that one or more data values are no longer required to be retained.

18. The data processing system of claim 15, wherein the control of storage of data values in the storage based on the indication in the instruction that one or more data values in a data source of the one or more indicated data sources are no longer required to be retained in said data source comprises:

for a data source for which the data values required to be retained comprise one or more input data values for use when performing data processing operations, the data source having a storage capacity for storing data values, when at least a threshold amount of space in the data source is not occupied by data values which are required to be retained, loading one or more new data values into the data source; and/or for a data source for which the data values required to be retained comprise one or more output data values from data processing operations, in response to an indication that one or more data values are no longer required to be retained, outputting from the data source those one or more data values which are no longer required to be retained.

19. A method of compiling a program to generate instructions for a data processor in which execution threads may execute program instructions to perform data processing operations, the data processor comprising:

an execution unit configured to execute instructions in a program to be executed to perform data processing operations for execution threads executing the program; and storage configured to store input data values for use by the execution unit when executing an instruction to perform a data processing operation for an execution thread and to store output data values generated by the execution unit when performing a data processing operation for an instruction being executed by an execution thread;

the method comprising:

including in one or more instructions in the program to be executed an indication of one or more data sources of the storage for use by the execution unit when performing a data processing operation, and also including an indication that one or more data values in a data source of the one or more indicated data sources are no longer required to be retained in said data source;

wherein each data source indicated in the one or more instructions along with an indication that one or more data values are no longer required to be retained in the data source, has associated metadata indicating a memory access pattern for loading data values from memory into the data source or for storing data values to memory from the data source, wherein the memory access pattern is permitted to differ between different data sources.

20. A method of operating a data processing system, the data processing system comprising:

a data processor, the data processor comprising:

an execution unit configured to execute instructions in a program to be executed to perform data processing operations for execution threads executing the program; and storage configured to store input data values for use by the execution unit when executing an instruction to perform a data processing operation for an execution thread, and to store output data values generated by the execution unit when performing a data processing operation for an instruction being executed by an execution thread;

wherein the data processing system is configured to control storage of data values in the storage according to plural different control procedures;

the method comprising:

the execution unit of the data processor executing an instruction indicating a data source of the storage for use when performing a data processing operation, and indicating which of the plural different control procedures is to be used for controlling storage of data values in the data source:

the data processing system controlling storage of data values in the data source based on the indication of which of the plural different control procedures is to be used for controlling storage of data values; and wherein each data source which is controlled based on indications that one or more data values are no longer required to be retained has associated metadata indicating a memory access pattern for loading data values from memory into the data source or for storing data values to memory from the data source, wherein the memory access pattern is permitted to differ between different data sources.

* * * * *